(12) United States Patent
Yoda

(10) Patent No.: US 11,720,498 B2
(45) Date of Patent: Aug. 8, 2023

(54) ARITHMETIC PROCESSING DEVICE AND ARITHMETIC PROCESSING METHOD

(71) Applicant: FUJITSU LIMITED, Kawasaki (JP)

(72) Inventor: Katsuhiro Yoda, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 17/573,667

(22) Filed: Jan. 12, 2022

(65) Prior Publication Data

US 2022/0365880 A1 Nov. 17, 2022

(30) Foreign Application Priority Data

May 13, 2021 (JP) .................................. 2021-081786

(51) Int. Cl.
*G06F 12/0877* (2016.01)
*G06F 12/02* (2006.01)
*G06F 12/0831* (2016.01)

(52) U.S. Cl.
CPC ...... *G06F 12/0877* (2013.01); *G06F 12/0238* (2013.01); *G06F 12/0833* (2013.01); *G06F 2212/1021* (2013.01)

(58) Field of Classification Search
CPC ............. G06F 12/0238; G06F 12/0811; G06F 12/0833; G06F 12/0846; G06F 12/0857; G06F 12/0864; G06F 12/0877; G06F 12/0895; G06F 2212/1021; G06F 2212/1024; Y02D 10/00
See application file for complete search history.

(56) References Cited

U.S. PATENT DOCUMENTS

| 2013/0046936 | A1* | 2/2013 | Tran .................... G06F 12/0813 711/119 |
| 2019/0138450 | A1* | 5/2019 | Nakra ................ G06F 12/0897 |
| 2019/0286563 | A1* | 9/2019 | Swamy .............. G06F 12/0842 |

FOREIGN PATENT DOCUMENTS

| JP | H10-088349 A | 4/1998 |
| JP | 2004-046643 A | 2/2004 |

* cited by examiner

*Primary Examiner* — Aracelis Ruiz
(74) *Attorney, Agent, or Firm* — Fujitsu Patent Center

(57) ABSTRACT

An arithmetic processing device including: request issuing units configured to issue an access request to a storage; and banks each of which includes: a first cache area including first entries; a second cache area including second entries; a control unit; and a determination unit that determines a cache hit or a cache miss for each of the banks, wherein the control unit performs: in response that the access requests simultaneously received from the request issuing units make the cache miss, storing the data, which is read from the storage device respectively by the access requests, in one of the first entries and one of the second entries; and in response that the access requests simultaneously received from the request issuing units make the cache hit in the first and second cache areas, outputting the data retained in the first and second entries, to each of issuers of the access requests.

9 Claims, 29 Drawing Sheets

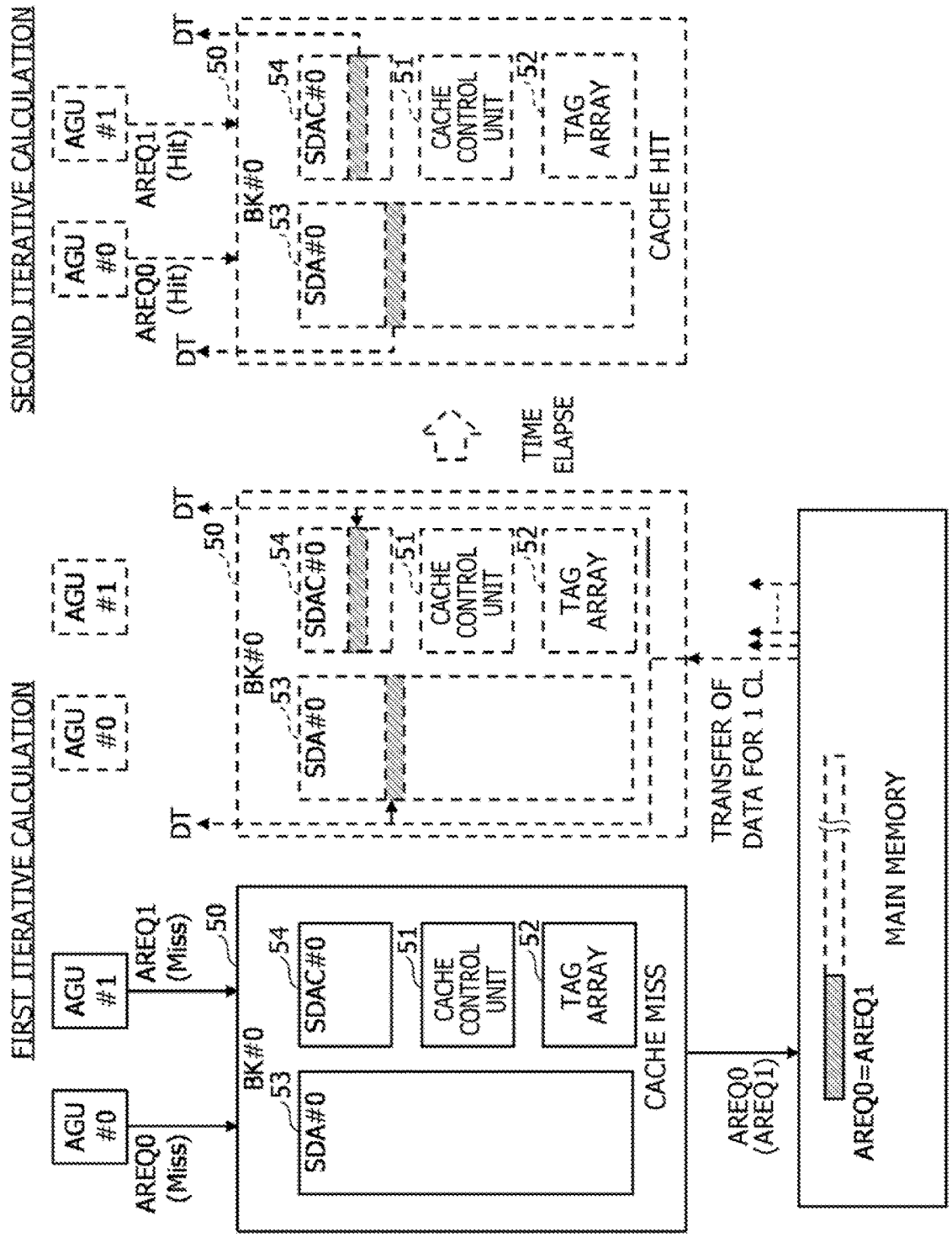

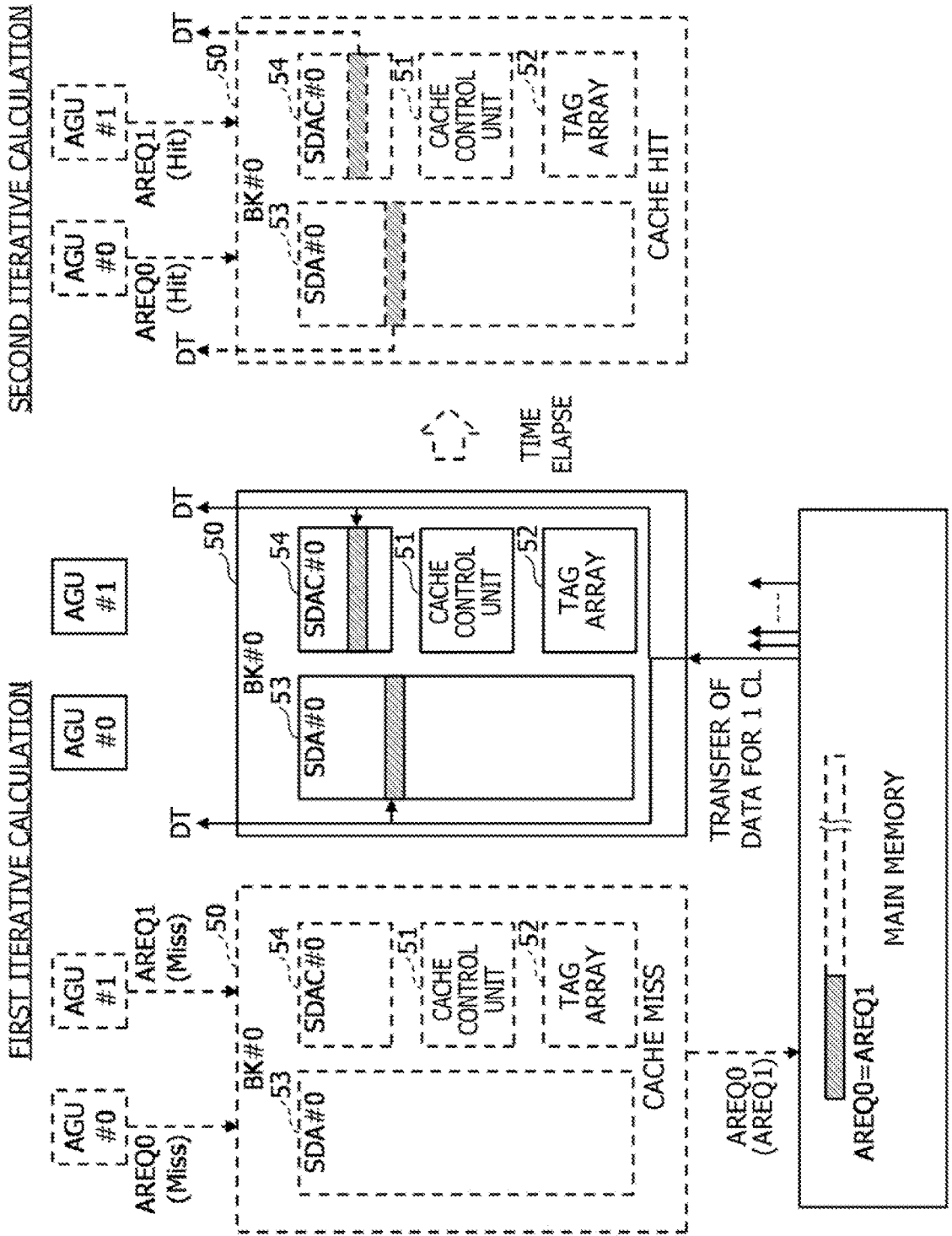

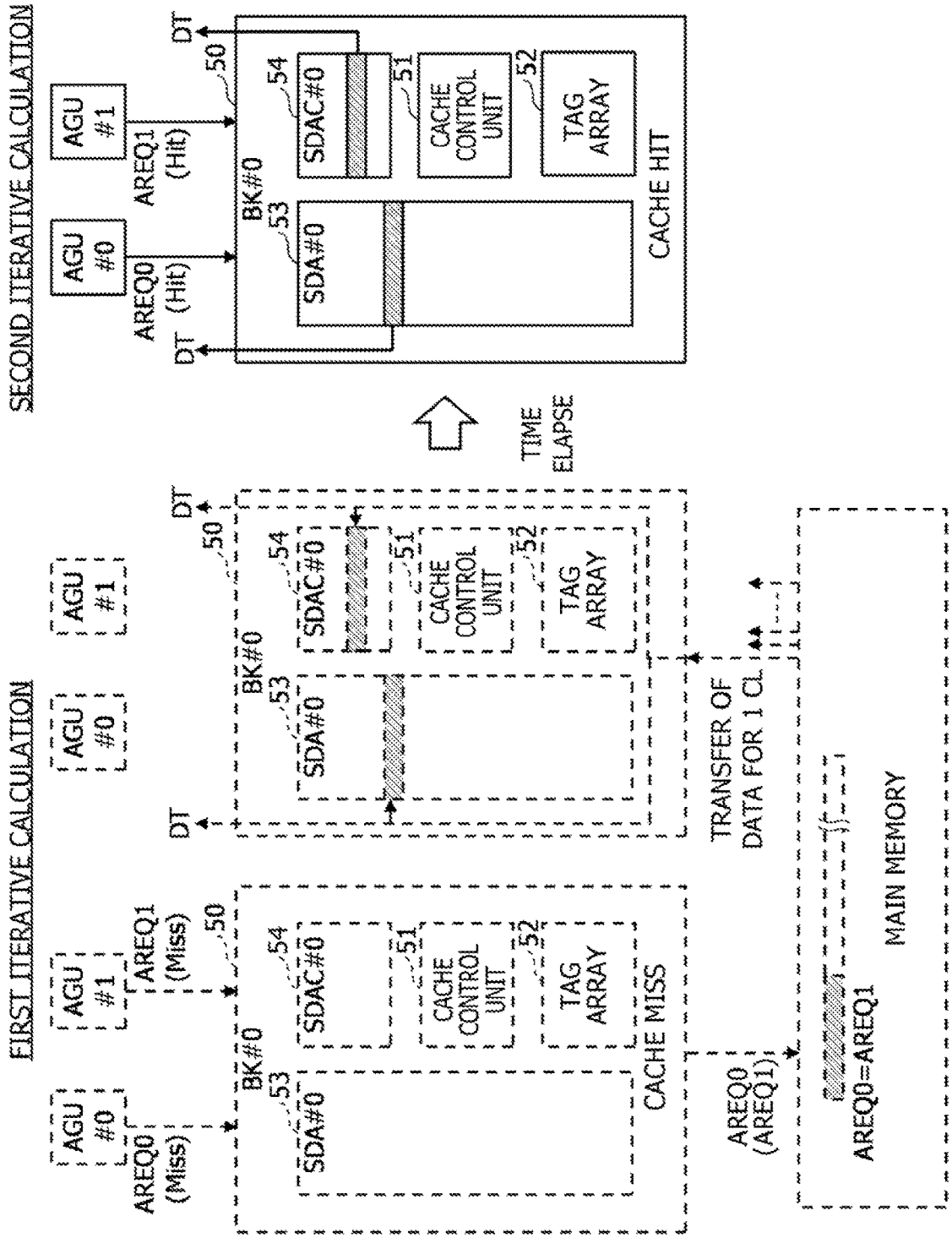

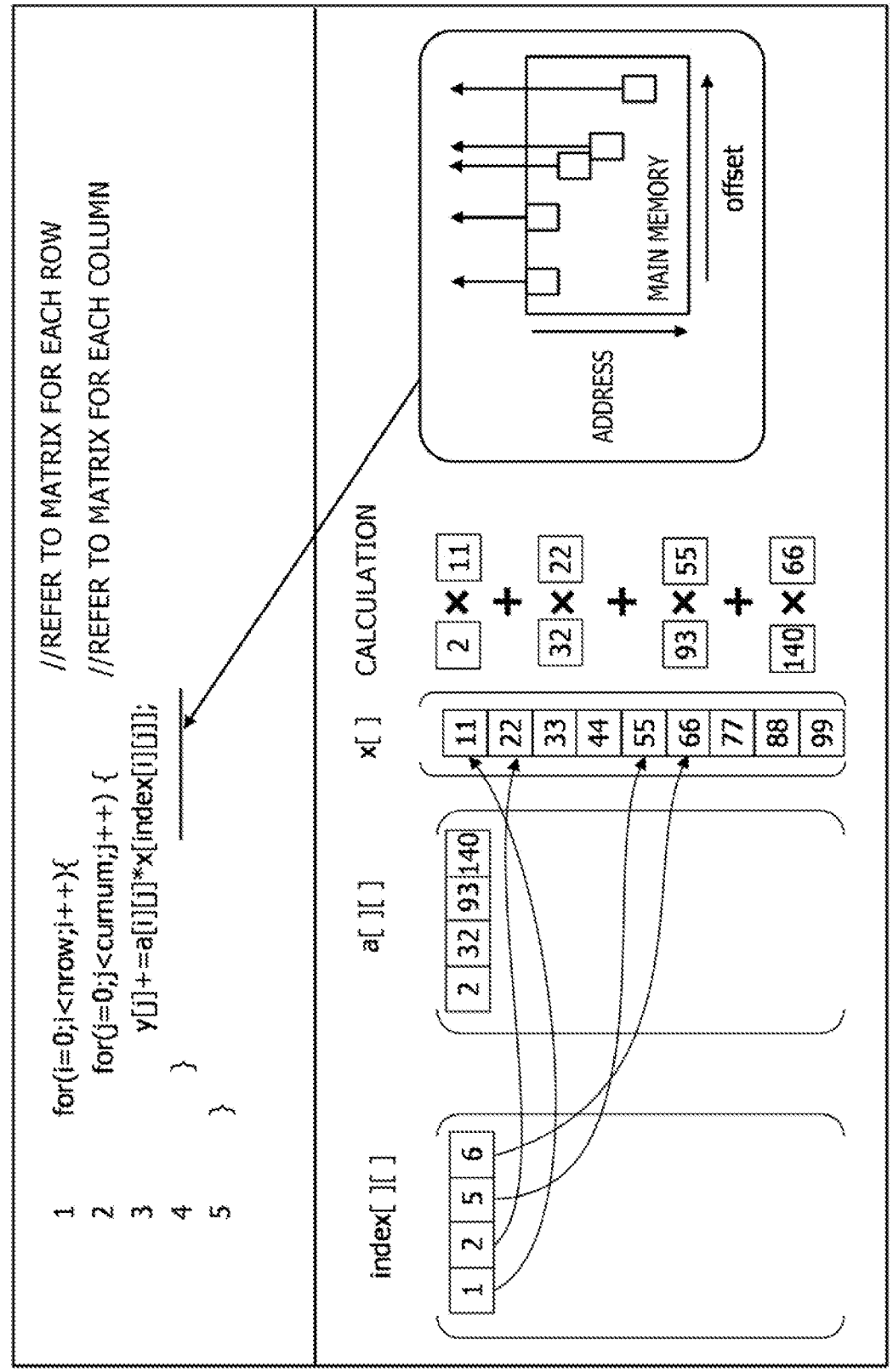

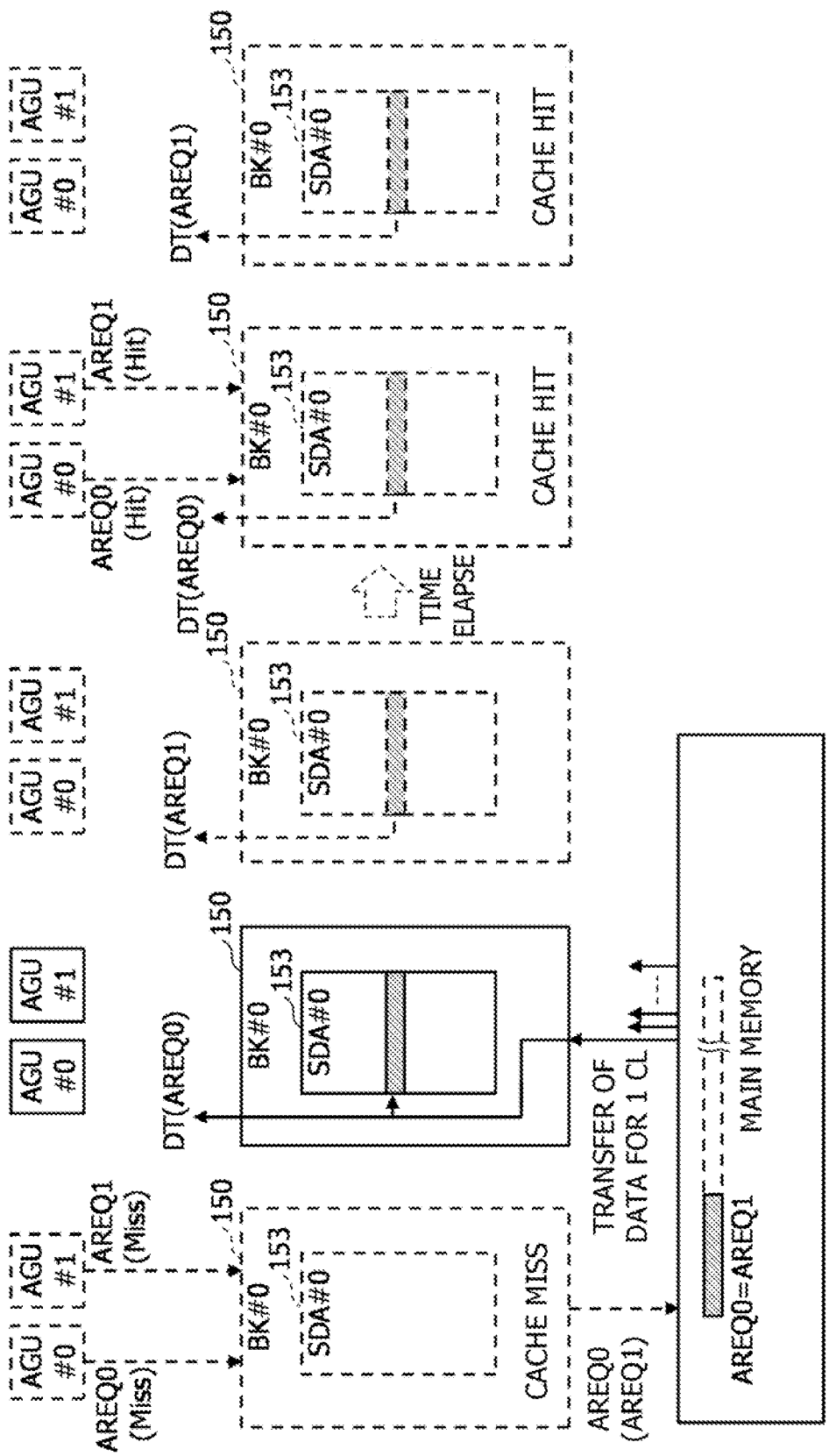

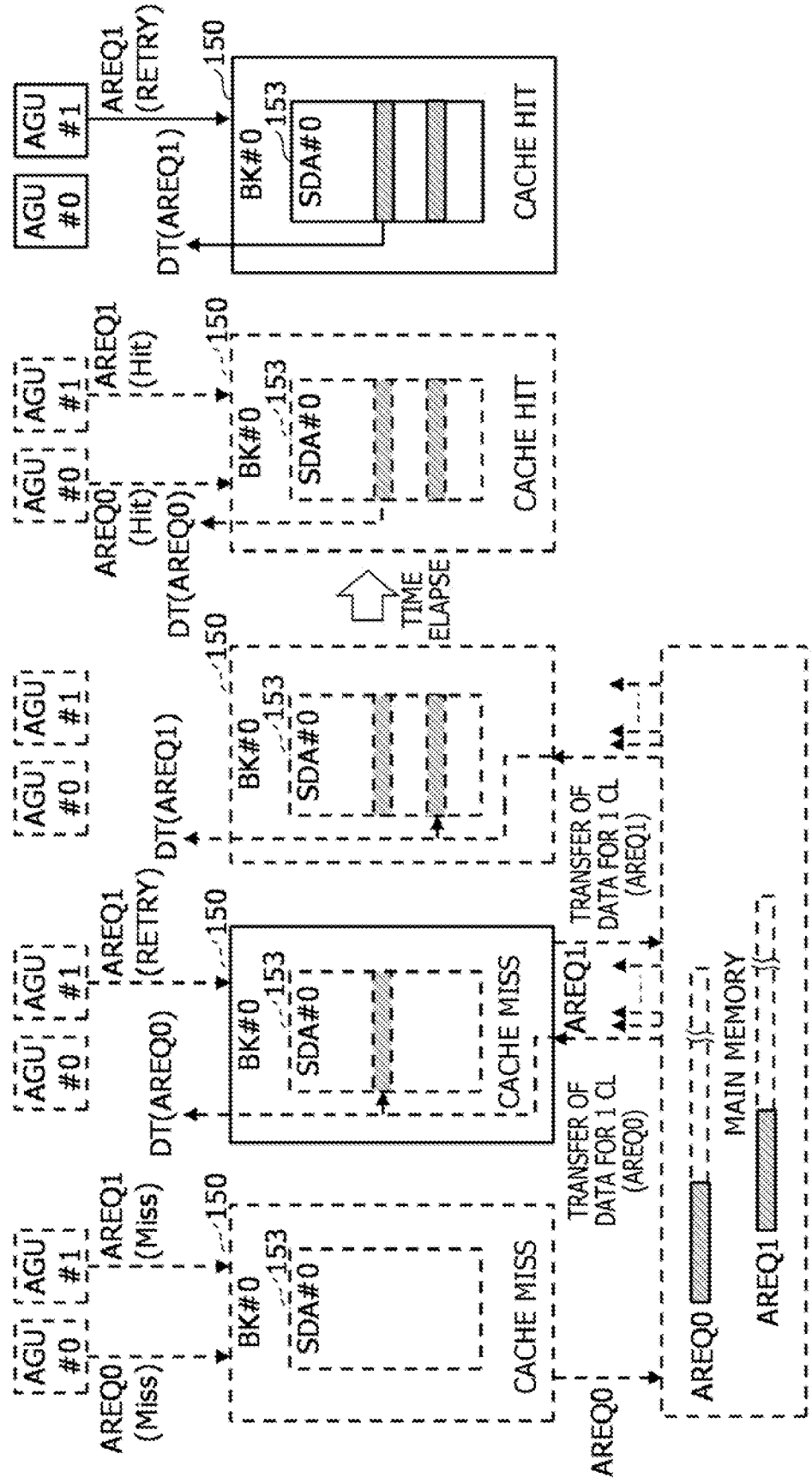

US 11,720,498 B2

ARITHMETIC PROCESSING DEVICE AND ARITHMETIC PROCESSING METHOD

CROSS-REFERENCE TO RELATED APPLICATION

This application is based upon and claims the benefit of priority of the prior Japanese Patent Application No. 2021-81786, filed on May 13, 2021, the entire contents of which are incorporated herein by reference.

FIELD

The embodiments discussed herein are related to an arithmetic processing device and an arithmetic processing method.

BACKGROUND

A cache provided in an arithmetic processing device, such as a central processing unit (CPU), or a cache arranged between the CPU and a main memory retains a part of data stored in the main memory. Then, in a case where the cache retains target data of an access request issued from the CPU (cache hit), it transfers the data retained in the cache to the CPU without issuing the access request to the main memory. As a result, data access efficiency is improved, and CPU processing performance is improved.

For example, a system having a cache including a plurality of cache banks and a plurality of CPUs determines a cache bank to be used according to the bank address included in the access request, thereby avoiding a cache bank conflict by the CPUs. Furthermore, in a case where an access request directed to the cache bank is received from a plurality of CPUs, the data output order is changed according to priorities assigned to the CPUs.

In a cache that includes a plurality of cache banks and receives access requests from a plurality of tasks, a cache bank is assigned to each task to avoid a cache bank conflict by the tasks.

Examples of the related art include as follows: Japanese Laid-open Patent Publication No. 2004-46643; and Japanese Laid-open Patent Publication No. 10-88349.

SUMMARY

According to an aspect of the embodiments, there is provided an arithmetic processing device including: a plurality of request issuing units each of which issues an access request to a storage device; and a plurality of banks each of which includes: a first cache area that includes a plurality of first entries capable of retaining data read from the storage device; a second cache area that includes a plurality of second entries; a cache control unit; and a hit miss determination unit that determines a cache hit or a cache miss for each of the plurality of banks on the basis of the access request issued from each of the plurality of request issuing units, wherein the cache control unit is configured to: in response that a plurality of the access requests simultaneously received from the plurality of request issuing units makes the cache miss, store the data, which is read from the storage device respectively in response to the plurality of access requests, in one of the first entries and one of the second entries; and in response that the plurality of access requests simultaneously received from the plurality of request issuing units makes the cache hit in the first cache area and the second cache area, output the data retained in the first entry and the second entry that have made the cache hit, to each of issuers of the plurality of access requests.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A to 5C are explanatory diagrams illustrating exemplary operation of the arithmetic processing device of FIG. 1;

FIG. 6 is an explanatory diagram illustrating exemplary sparse matrix calculation to be used in graphic calculation and the like;

FIGS. 7A to 7E are explanatory diagrams illustrating exemplary operation of another arithmetic processing device;

FIGS. 14A to 14E are explanatory diagrams illustrating exemplary operation of another arithmetic processing device;

DESCRIPTION OF EMBODIMENTS

However, in a case of assigning a cache bank to each request issuing unit that issues an access request such as a CPU or a task, a circuit scale of the cache increases. Furthermore, since the issuance frequency of the access request differs depending on the task or the like, a usage rate of a storage area in each cache bank may vary, and a usage rate of the storage area in the entire cache may decrease. Meanwhile, in a case where a cache bank is shared by a plurality of request issuing units, the data read latency for an access request with a lower priority becomes longer when access requests directed to the cache bank conflict. As a result, processing efficiency of the CPU, task, and the like is lowered.

In one aspect, it is an object of the embodiments to output data without occurrence of an access conflict even in a case of simultaneously receiving access requests from a plurality of access request units.

Hereinafter, embodiments will be described with reference to the drawings.

Figure 1:
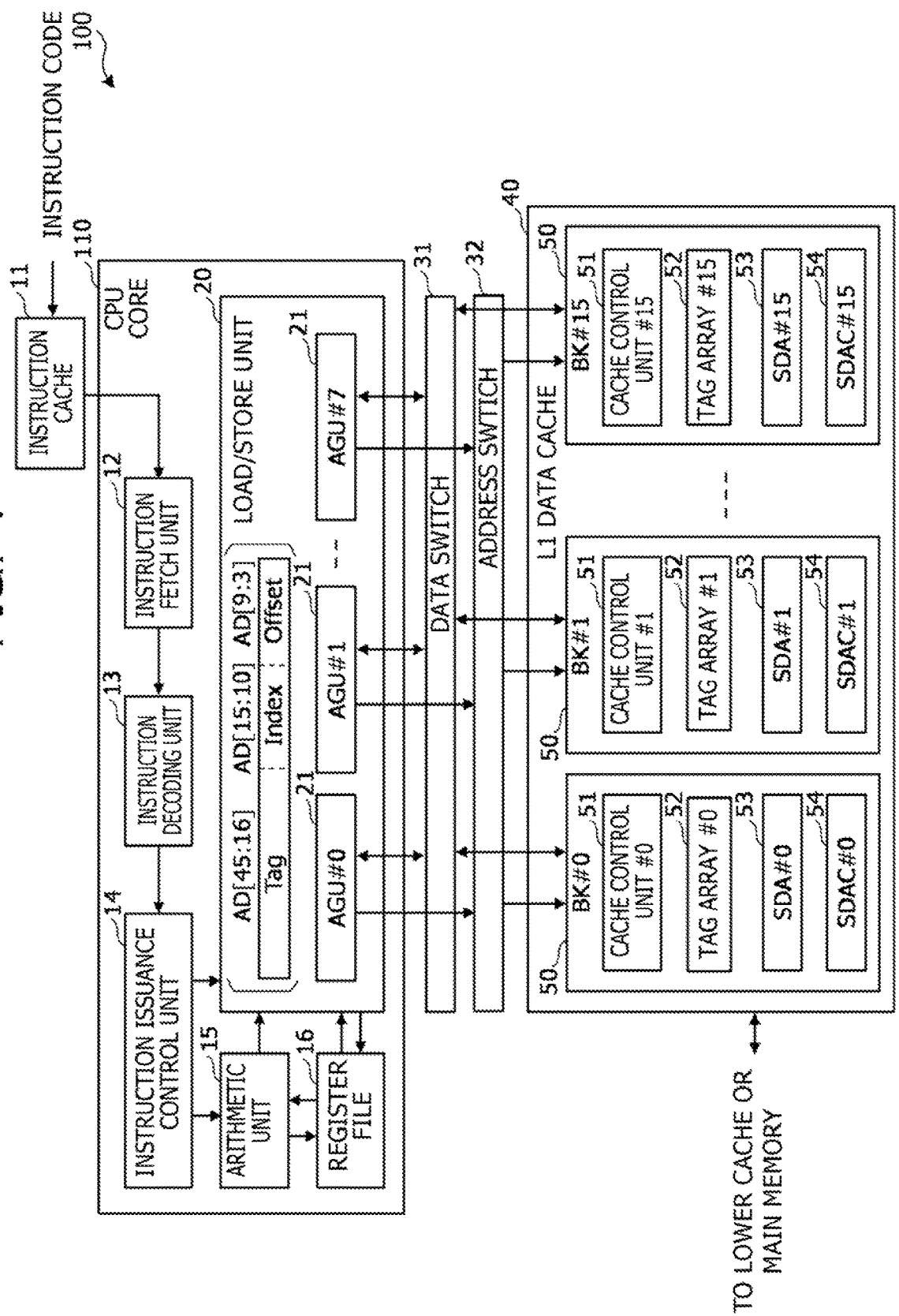
FIG. 1 is a block diagram illustrating an exemplary arithmetic processing device according to an embodiment.

FIG. 1 illustrates an exemplary arithmetic processing device according to an embodiment. An arithmetic processing device 100 illustrated in FIG. 1 is, for example, a processor such as a CPU having a function of executing a plurality of product-sum operations and the like in parallel using a single instruction multiple data (SIMD) operation instruction. For example, with the arithmetic processing device 100 used, it is possible to execute sparse matrix-vector multiplication (SpMV) to be used in graphic calculation and the like.

The arithmetic processing device 100 includes a CPU core 110, a data switch 31, an address switch 32, and an L1 data cache 40. The CPU core 110 includes an instruction fetch unit 12, an instruction decoding unit 13, an instruction issuance control unit 14, an arithmetic unit 15, a register file 16, and a load/store unit 20.

The load/store unit 20 includes a plurality of address generation units (AGUs) 21. The L1 data cache 40 includes 16 banks 50 (BK #0 to BK #15). Hereinafter, each of the banks 50 may also be referred to as a bank BK. Each bank BK includes a cache control unit 51, a tag array 52, a sub data array 53 (SDA #0 to SDA #15), and a sub data array cache 54 (SDAC #0 to SDAC #15).

The instruction fetch unit 12 fetches an instruction from an instruction cache 11 that stores a part of instructions retained in a lower cache or in the main memory on the basis of an address or a branch address generated by a program counter, and outputs the fetched instruction to the instruction decoding unit 13. The instruction decoding unit 13 sequentially decodes the instructions received from the instruction fetch unit 12, and outputs the instruction data obtained by the decoding to the instruction issuance control unit 14 in order.

The instruction issuance control unit 14 includes, for example, a reservation station, and has a plurality of entries (not illustrated) retaining the instruction data in the order of being decoded by the instruction decoding unit 13. The instruction issuance control unit 14 outputs the instruction data retained in the entries to the arithmetic unit 15 in the executable order (out-of-order).

The arithmetic unit 15 includes a memory address generator, a fixed-point computing element, a floating-point computing element, and the like (not illustrated). The memory address generator issues an access request to the load/store unit 20 on the basis of a load instruction or a store instruction. The access request includes an address indicating an access type (load or store) and an access destination. For example, the fixed-point computing element includes a logical operation unit, a shift operation unit, and the like, and the fixed-point computing element includes a product-sum operation unit and the like capable of executing SIMD operation instructions. With the SIMD operation instruction, it becomes possible to execute a plurality of operations in parallel (simultaneously), and to improve calculation efficiency of the sparse matrix-vector multiplication and the like.

The register file 16 includes a plurality of registers that retains data (operand) to be used for an operation or an operation result. For example, the register file 16 includes a register file for floating-point numerical data and a register file for fixed-point numerical data. The operands retained in the register file 16 are transferred from the L1 data cache 40, and the operation result retained in the register file 16 is transferred to the L1 data cache 40.

In the load/store unit 20, each of the address generation units 21 outputs an address AD included in the access request transferred from the arithmetic unit 15 to each of the banks BK #0 to BK #15 of the L1 data cache 40 via the address switch 32. The address AD is a load address or a store address. The access request is an access request directed to the lower cache or the main memory. The address generation unit 21 is an example of the request issuing unit that issues an access request. Hereinafter, the address generation unit 21 may also be referred to as an AGU 21 or AGU #0 to AGU #7.

For example, the address AD includes a 30-bit tag address (Tag, AD[45:16]), a 6-bit index address (Index, AD[15:10]), and a 7-bit offset address (Offset, AD[9:3]). The upper 4 bits of the offset address are used to identify the 16 banks BK. The lower 3 bits of the offset address are used to identify, of the 64-bit data retained in the bank BK, the 8-bit, 16-bit, or 32-bit position to be selected depending on the type of the operation instruction.

In a case where the access request is a write access request (store instruction), each of the address generation units 21 outputs the write data (stored data) to the respective banks BK #0 to BK #15 of the L1 data cache 40 via the data switch 31. In a case where the access request is a read access request (load instruction), each of the address generation units 21 receives the read data (loaded data) from any of the banks BK #0 to BK #15 of the L1 data cache 40 via the data switch 31.

The data switch 31 outputs the stored data received from the load/store unit 20 for each of the AGUs 21 to the bank BK identified by the offset address. Furthermore, the data switch 31 outputs the loaded data output from each bank BK to the load/store unit 20 in correspondence with the AGU 21 that is an issuer of the access request.

The address switch 32 outputs the address AD output from each of the AGUs 21 to each bank BK. Hereinafter, a process of reading data from the L1 data cache 40 on the basis of the load instruction will be mainly described.

Figure 3:
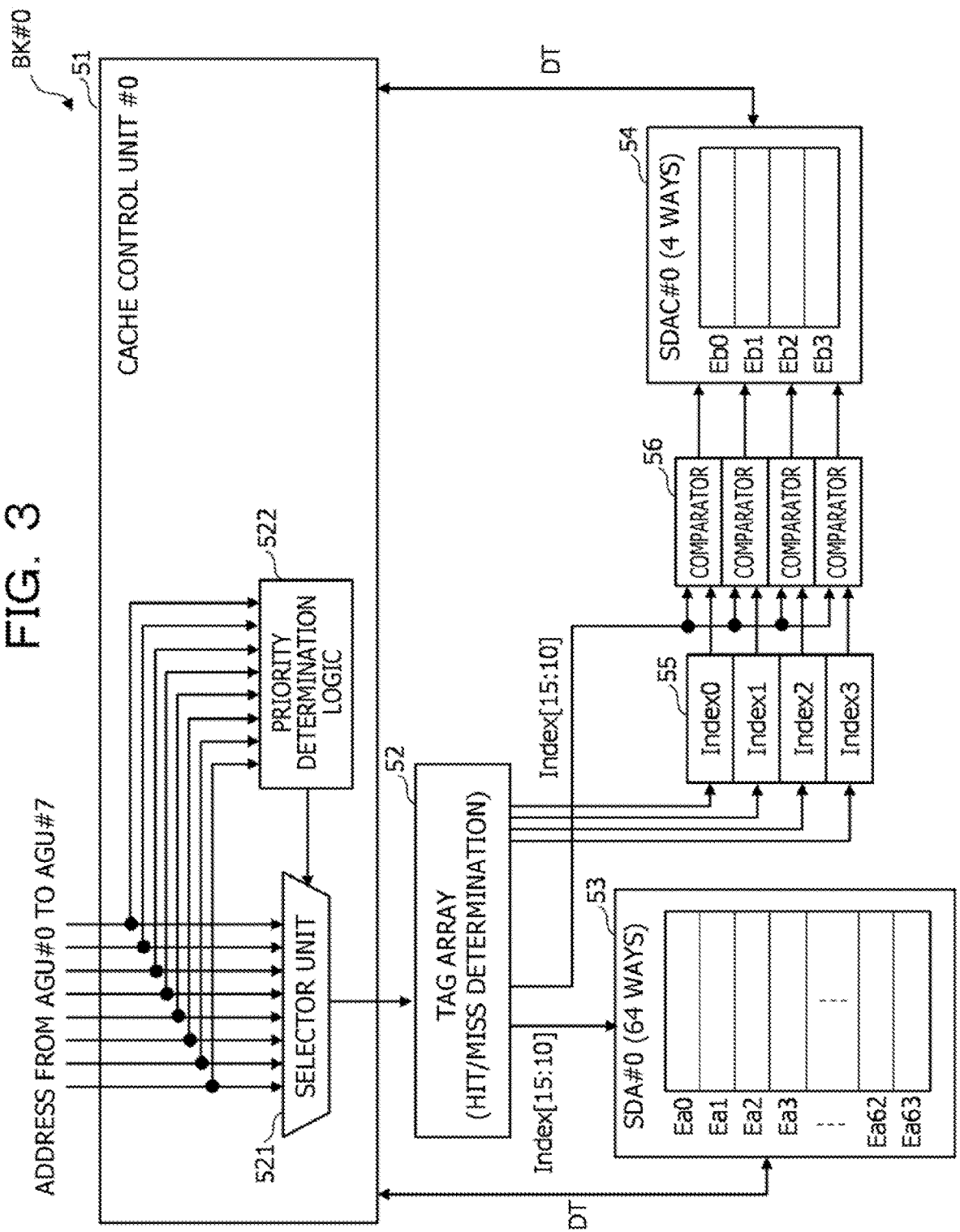
FIG. 3 is a block diagram illustrating an exemplary configuration of a bank BK #0 in FIG. 1.

The cache control unit 51 of each bank BK determines priorities of the access requests received from the plurality of AGUs 21, and outputs the address included in the access request to the tag array 52 of its own bank BK according to the determined priority. The cache control unit 51 of each bank BK controls operations of the sub data array SDA and the sub data array cache SDAC on the basis of the determination result of the cache hit or cache miss by the tag array 52 or its own bank BK. An example of the cache control unit 51 is illustrated in FIG. 3.

The tag array 52 of each bank BK determines a cache hit or cache miss on the basis of the address supplied from the cache control unit 51 of its own bank BK, and outputs the determination result to the cache control unit 51 of its own bank BK. A cache hit indicates that the data corresponding to the address AD is retained in the L1 data cache 40. A cache miss indicates that the data corresponding to the address AD is not retained in the L1 data cache 40. In a case of having determined a cache hit, the tag array 52 of each bank BK outputs the index address to the sub data array SDA and to the sub data array cache SDAC.

Each of the tag arrays 52 has 64 entries identified by an index address. Each of the entries is capable of retaining a tag address. In a case where each of the tag arrays 52 retains the tag address supplied from the cache control unit 51 in the entry identified by the index address supplied from the cache control unit 51, it outputs hit information indicating a cache hit, the index address, and the offset address.

Furthermore, in a case where each of the tag arrays 52 does not retain the tag address received from the cache control unit 51 in the entry identified by the index address received from the cache control unit 51, it outputs miss information indicating a cache miss, the index address, and the offset address. The tag array 52 is an example of a hit miss determination unit that determines a cache hit or cache miss for each bank BK.

Note that, in a case where any of the tag arrays 52 determines a cache miss, the L1 data cache 40 may also cause all the tag arrays 52 to determine the cache miss. Alternatively, the bank BK including the tag array 52 that has determined the cache miss may also notify other banks BK of the occurrence of the cache miss.

With this arrangement, it becomes possible to maintain the cache coherency of the L1 data cache 40 in a case where the bank BK that has determined a cache miss issues an access request to the lower cache or to the main memory at the time of the cache miss. In other words, for example, it becomes possible to store, in the sub data array 53, data for one cache line transferred from the lower cache or from the main memory in all the banks BK including the tag array 52 that has not received the access request (address).

The L1 data cache 40 stores a part of the data retained in the lower cache or in the main memory in the sub data array 53 (SDA #0 to SDA #15) or in the sub data array cache 54 (SDAC #0 to SDAC #15).

The lower cache or the main memory is an example of a storage device. In a case where the data to be used for the operation is stored in the L1 data cache 40 (cache hit), the data read from the L1 data cache 40 is transferred to the register file 16 via the data switch 31 and the load/store unit 20.

On the other hand, in a case where the data to be used for the operation is not stored in the L1 data cache 40 (cache miss), the data is transferred from the lower cache or from the main memory to the L1 data cache 40. The L1 data cache 40 transfers the transferred data to the register file 16 via the data switch 31 and the load/store unit 20, and also retains it in the L1 data cache 40. Exemplary configurations of the sub data array 53 and sub data array cache 54 of the L1 data cache 40 will be described with reference to FIG. 2. Hereinafter, descriptions will be given on the assumption that the L1 data cache 40 is directly connected to the main memory without passing through the lower cache.

Figure 2:
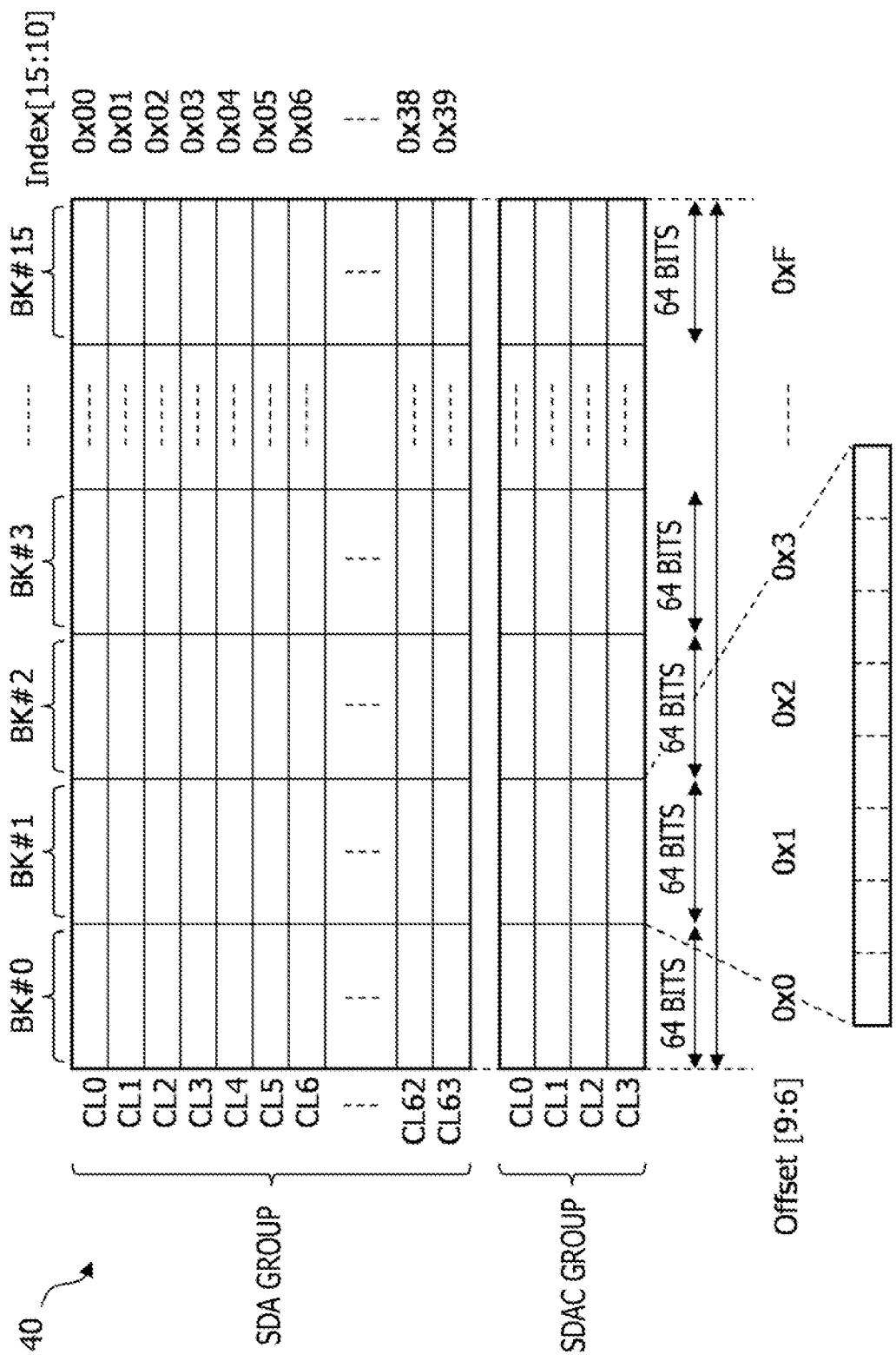
FIG. 2 is a block diagram illustrating exemplary configurations of a sub data array and a sub data array cache of an L1 data cache in FIG. 1.

FIG. 2 illustrates exemplary configurations of the sub data array 53 and sub data array cache 54 of the L1 data cache 40 in FIG. 1. The L1 data cache 40 includes the sub data array 53 and the sub data array cache 54 for each bank BK. The sub data array 53 is an example of a first cache area, and the sub data array cache SDAC is an example of a second cache area. Hereinafter, the sub data array 53 may also be referred to as an SDA 53, and the sub data array cache 54 may also be referred to as an SDAC 54.

The SDA 53 of each bank BK has 64 entries identified by the index address. The entry of the SDA 53 is an example of a first entry. A data width of each entry is 64 bits. Therefore, in the SDA group including 16 SDAs 53, it is possible to retain 1024-bit data in a cache line CL (any of CL0 to CL63) allocated across the 16 SDAs 53 of the 16 banks BK.

For example, the L1 data cache 40 issues an access request to the main memory in a case where any of the banks BK makes a cache miss. Then, the L1 data cache 40 stores the data of one cache line CL (1024 bits) transferred from the main memory in the 16 entries to which a common index address of the SDA group is assigned.

The SDAC 54 of each bank BK has four entries that may be associated with any index address. The entry of the SDAC 54 is an example of a second entry. Each of the four entries of the SDAC 54 of each bank BK retains a copy of the 64-bit data retained in the entry of the SDA 53 for each bank BK independently of the cache line CL.

Note that the number of entries of the SDAC 54 for each bank BK is not limited to four as long as it is less than the number of entries of the SDA 53. With the number of entries of the SDAC 54 for each bank BK set to be less than the number of entries of the SDA 53, it becomes possible to improve the access efficiency while suppressing the circuit scale of each bank BK, as will be described with reference to FIGS. 5A to 5C.

FIG. 3 is an exemplary configuration of the bank BK #0 in FIG. 1. Configurations of other banks BK #1 to BK #15 are similar to FIG. 3. The bank BK #0 includes an index retainer 55 and a comparator 56 in addition to the configuration illustrated in FIG. 1. The index retainer 55 and the comparator 56 are provided to correspond to respective entries EB (Eb0 to Eb3) of the SDAC #0.

The cache control unit 51 includes a selector unit 521 and a priority determination logic 522. In a case where the priority determination logic 522 simultaneously receives access requests (addresses, etc.) to its own bank BK #0 from the plurality of AGUs 21 (AGU #0 to AGU #7), it causes the selector unit 521 to select the access request with the highest priority and the access request with the second highest priority.

Here, the simultaneous reception of the access requests indicates that the cache control unit 51 simultaneously receives a plurality of access requests in which the upper 4 bits of the offset address indicate its own bank BK #0. Note that, for example, the priority may also be determined using a method such as Least Recently Used (LRU). In a case where the cache control unit 51 receives one access request in which the upper 4 bits of the offset address indicate its own bank BK #0, it processes the received one access request as an access request with the highest priority.

The selector unit 521 outputs the access request with the highest priority to the SDA #0. Then, any of entries Ea (Ea0 to Ea63) of the SDA #0 is selected using the index address included in the access request with the highest priority. The selector unit 521 outputs the access request with the second highest priority to the SDAC #0. Then, the index address included in the access request with the second highest priority is output to the comparator 56. The priority determination logic 522 is an example of a priority determination unit that determines priorities of a plurality of access requests simultaneously received from the plurality of AGUs 21.

In a case where the index retainer 55 has received a plurality of access requests having the same index address together with miss information indicating a cache miss, it stores the index address in the index retainer 55 corresponding to any of the entries Eb of the SDAC #0. Then, the cache control unit 51 stores the data transferred from the main memory at the time of a cache miss in both the entry Ea of the SDA #0 and the entry Eb of the SDAC #0.

For example, in a case where the index address with the cache miss is "3", the cache control unit 51 stores the data in the entry Ea3 of the SDA #0, and stores the index address "3" in any of the index retainers 55. Then, the cache control unit 51 stores a copy of the data stored in the entry Ea3 of the SDA #0 in the entry Eb of the SDAC #0 corresponding to the index retainer 55 retaining the index address "3".

Note that, in a case where a cache miss is determined in any of the tag arrays 52 of the bank BK, the cache control units 51 of all the banks BK #0 to BK #15 execute control of receiving data transferred from the main memory. In this case, data for one cache line CL is output from the main memory, and the data is stored in the entry Ea corresponding to the common index address in the SDA #0 to SDA #15 of all the banks BK #0 to BK #15.

Then, the index address is stored in only in any of the index retainers 55 of the bank BK identified by the offset address included in the plurality of access requests (cache misses) having the same address. Here, the same address indicates that the tag address, index address, and offset address included in the plurality of access requests are the same.

In a case where a cache hit occurs in the bank BK #0, each of the comparators 56 compares the index address retained in each of the index retainers 55 with the index address transferred from the selector unit 521. In a case where the index addresses are matched, each of the comparators 56 determines a cache hit of the SDAC 54. Then, each of the comparators 56 causes the corresponding Eb in the SDAC #0 to output data. The data output from the entry Eb of the SDAC #0 is output to the cache control unit 51 as data DT. Furthermore, in a case where a cache hit occurs in the bank BK #0, the data output from the entry Ea of the SDA #0 is output to the cache control unit 51 as data DT.

In the cache control unit 51 illustrated in FIG. 3, it is possible to select the access request with the highest priority and the access request with the second highest priority using the priority determination logic 522. Then, it is possible to cause the SDA #0 and the SDAC #0 to retain the same data according to the priority. As a result, in a case where a plurality of access requests having the same address is simultaneously issued and a cache hit occurs, it is possible to output data in parallel from the SDA #0 and the SDAC #0 in response to the access requests, whereby it becomes possible to improve the access efficiency.

Furthermore, in a case where a plurality of access requests having different addresses is simultaneously issued, it is possible to select the access request with the highest priority, and to cause the SDA #0 to retain the data corresponding to the access request with the highest priority. Moreover, in a case where a single access request is issued, the priority of the single access request is the highest, whereby it is possible to cause the SDA #0 to retain the data corresponding to the single access request.

Note that, although an exemplary case where each bank BK includes one SDAC 54 is described in the present embodiment, each bank BK may also include a plurality of SDACs 54. In this case, the priority determination logic 522 causes the selector unit 521 to sequentially select the access request with the highest priority and the plurality of access requests with the second and lower priorities. The selector unit 521 outputs the access requests with the second highest and subsequent priorities to each of the plurality of SDACs.

Figure 4:
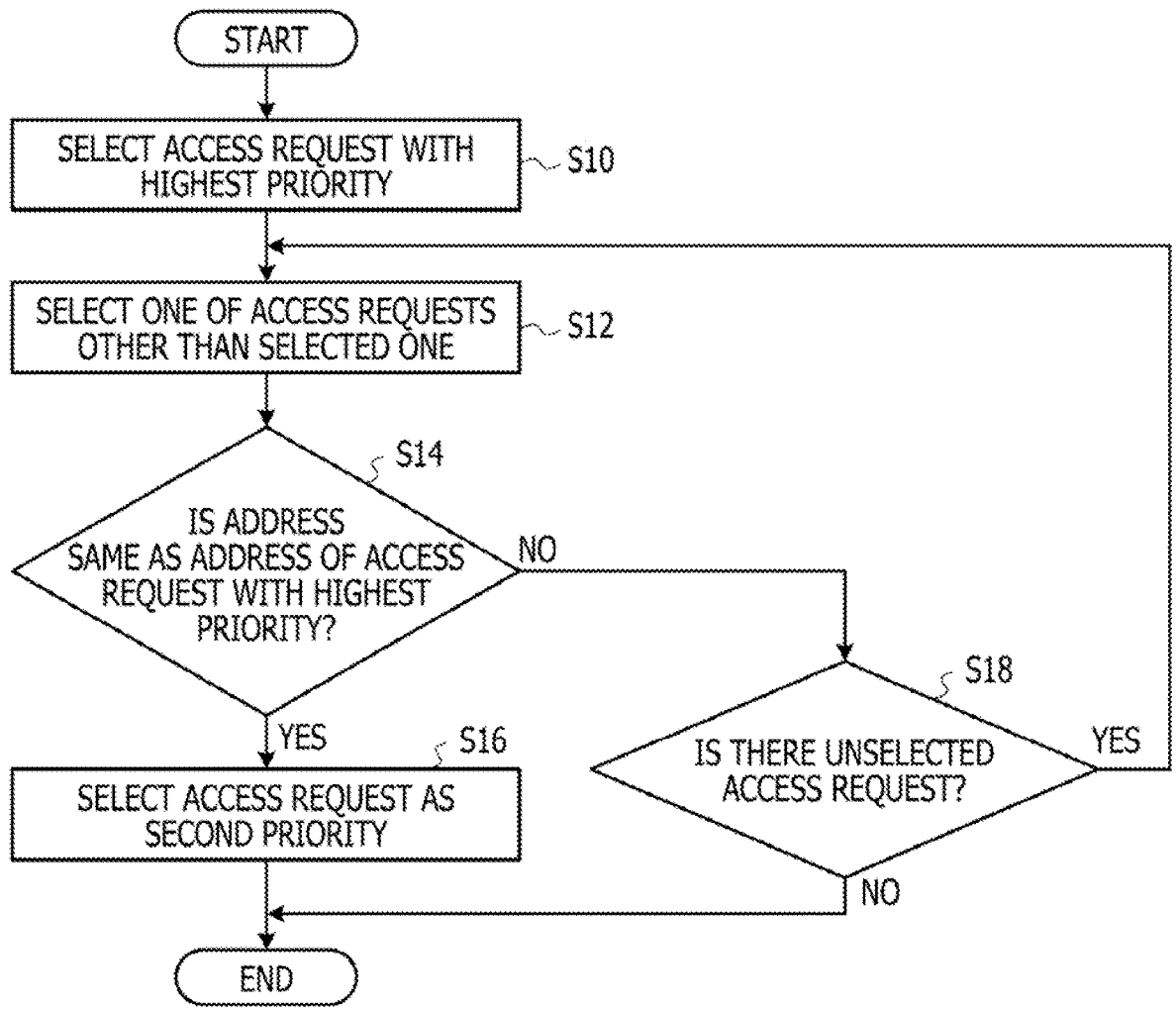
FIG. 4 is a flowchart illustrating exemplary operation of priority determination logic in FIG. 3.

FIG. 4 illustrates exemplary operation of the priority determination logic 522 in FIG. 3. The operation illustrated in FIG. 4 is common to a time of a cache hit and a time of a cache miss.

First, in step S10, the priority determination logic 522 selects the access request with the highest priority. Note that, if one access request is issued, the priority determination logic 522 selects the one access request as the access request with the highest priority, and terminates the operation illustrated in FIG. 4.

Next, in step S12, the priority determination logic 522 selects one of the access requests other than the selected access request. Next, in step S14, the priority determination logic 522 determines whether or not the address of the access request selected in step S12 is the same as the address of the access request with the highest priority. The priority determination logic 522 executes step S16 if the addresses are the same, and executes step S18 if the addresses are not the same.

In step S16, the priority determination logic 522 selects the access request selected in step S12 as a second priority, and terminates the operation illustrated in FIG. 4. In step S18, the priority determination logic 522 determines whether or not there is an unselected access request. The priority determination logic 522 returns the operation to step S12 if there is an unselected access request. If all the access requests issued simultaneously are selected, the priority determination logic 522 determines that there is no access request having the address same as that of the access request with the highest priority and that there is no conflict of access requests, and terminates the operation illustrated in FIG. 4.

According to the operation described above, the priority determination logic 522 is enabled to select the access request with the highest priority and the access request with the second highest priority if there is a plurality of access requests having the same address.

FIGS. 5A to 5C illustrate an exemplary operation of the arithmetic processing device 100 of FIG. 1. For example, FIGS. 5A to 5C illustrate an arithmetic processing method of the arithmetic processing device 100. In FIGS. 5A to 5C, data to be used for iterative calculation such as sparse matrix-vector multiplication is stored in the main memory. Furthermore, access requests AREQ0 and AREQ1 having the same address are issued from the AGU #0 and the AGU #1. The priority of the access request AREQ0 is assumed to be higher than the priority of the access request AREQ1. Determination of a cache miss/cache hit is made for each bank BK using the tag array 52 illustrated in FIG. 1.

First, at the time of first iterative calculation, the tag array 52 of the bank BK #0 determines a cache miss (Miss) of the access requests AREQ0 and AREQ1 having the same address, and makes notification to the cache control unit 51 in FIG. 5A. The cache control unit 51 issues the access request AREQ0 with the highest priority to the main memory on the basis of the cache miss determination. However, since the addresses of the access requests AREQ0 and AREQ1 are the same each other, the cache control unit 51 is meant to issue the access requests AREQ0 and AREQ1 to the main memory at the same time.

In FIG. 5B, the main memory transfers the data for one cache line CL indicated by an oblique line frame and a broken line frame to the L1 data cache 40 (FIG. 1) as a response to the access request AREQ0. The data in the oblique line frame is data indicated by the index address of the bank BK #0. The data in the broken line frame is data indicated by the index address banks of other banks BK #1 to BK #15.

The cache control unit 51 of the BK #0 outputs the data DT (e.g., 64 bits) received from the main memory to the issuer of each of the access requests AREQ0 and AREQ1. Furthermore, the cache control unit 51 of the bank BK #0 stores the data DT received from the main memory in the entry Ea corresponding to the index address included in the access requests AREQ0 and AREQ1 in the SDA #0. Moreover, the cache control unit 51 of the bank BK #0 stores data same as the data stored in the entry Ea in any of the entries Eb of the SDAC #0.

Meanwhile, each of the cache control units 51 of the other banks BK #1 to BK #15 that has not received the access request (not illustrated) stores the data DT received from the main memory in the entry Ea corresponding to the index address included in the access request in the SDA. The cache control units 51 of the other banks BK #1 to BK #15 do not store data in the entry Eb of the SDAC.

Next, at the time of second iterative calculation, the tag array 52 of the bank BK #0 determines a cache hit (Hit) of the access requests AREQ0 and AREQ1 having the same address, and makes notification to the cache control unit 51 in FIG. 5C. The cache control unit 51 extracts the data DT from the entry Ea corresponding to the index address included in the access request AREQ0 in the SDA #0 on the basis of the cache hit determination. Furthermore, the cache control unit 51 extracts the data DT from the entry Eb for which a cache hit has been determined by the comparator 56 in FIG. 3 in the SDAC #0. Then, the cache control unit 51 simultaneously outputs the data DT simultaneously extracted from the entries Ea and Eb to the issuers of the access requests AREQ0 and AREQ1.

With this arrangement, it becomes possible to improve the access efficiency in the case where the two access requests AREQ0 and AREQ1 having the same address are subject to the cache hit in the second and subsequent iterative calculations. For example, it becomes possible to set the access latency for transferring the data DT to the issuers of the access requests AREQ0 and AREQ1 to be the same as the access latency for transferring the data DT to the issuer of the single access request AREQ0.

FIG. 6 illustrates exemplary sparse matrix calculation to be used in graphic calculation and the like. The upper part of FIG. 6 illustrates instruction descriptions to be used for the sparse matrix calculation, and the lower part of FIG. 6 illustrates an outline of gather loading at the time of executing the instruction of the third row in the upper part of FIG. 6.

FIGS. 7A to 7E are explanatory diagrams illustrating exemplary operation of another arithmetic processing device. Detailed descriptions of operations similar to those in FIGS. 5A to 5C are omitted. A configuration of the arithmetic processing device that executes the operation illustrated in FIGS. 7A to 7E is a configuration similar to that of the arithmetic processing device 100 of FIG. 1 except that each bank BK (150) includes an SDA (153) and includes no SDAC. In a similar manner to FIGS. 5A to 5C, in FIGS. 7A to 7E, data to be used for iterative calculation is retained in the main memory, and the access requests AREQ0 and AREQ1 having the same address are issued from the AGU #0 and the AGU #1.

Figure 7A:
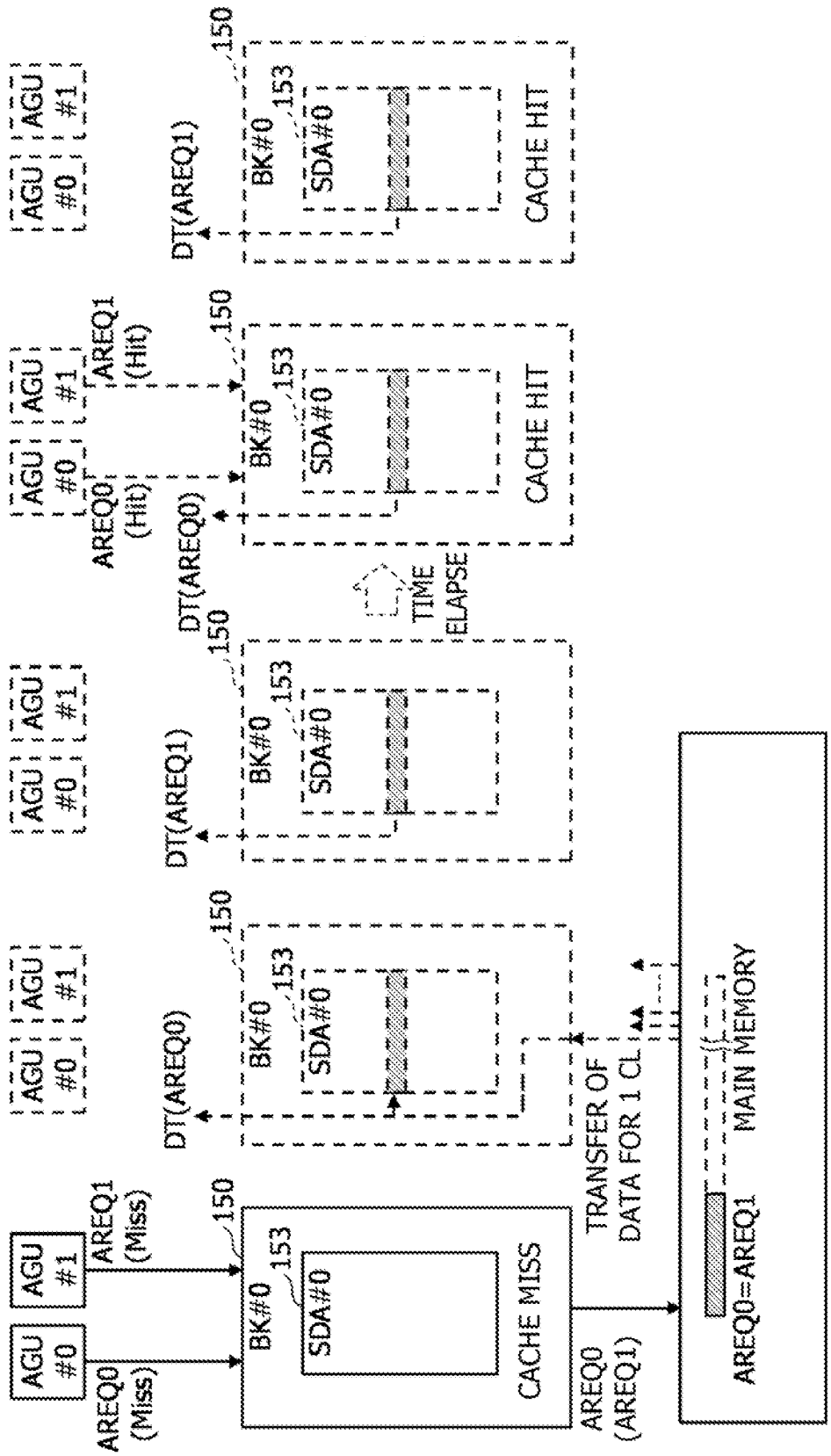
Figure 7C:
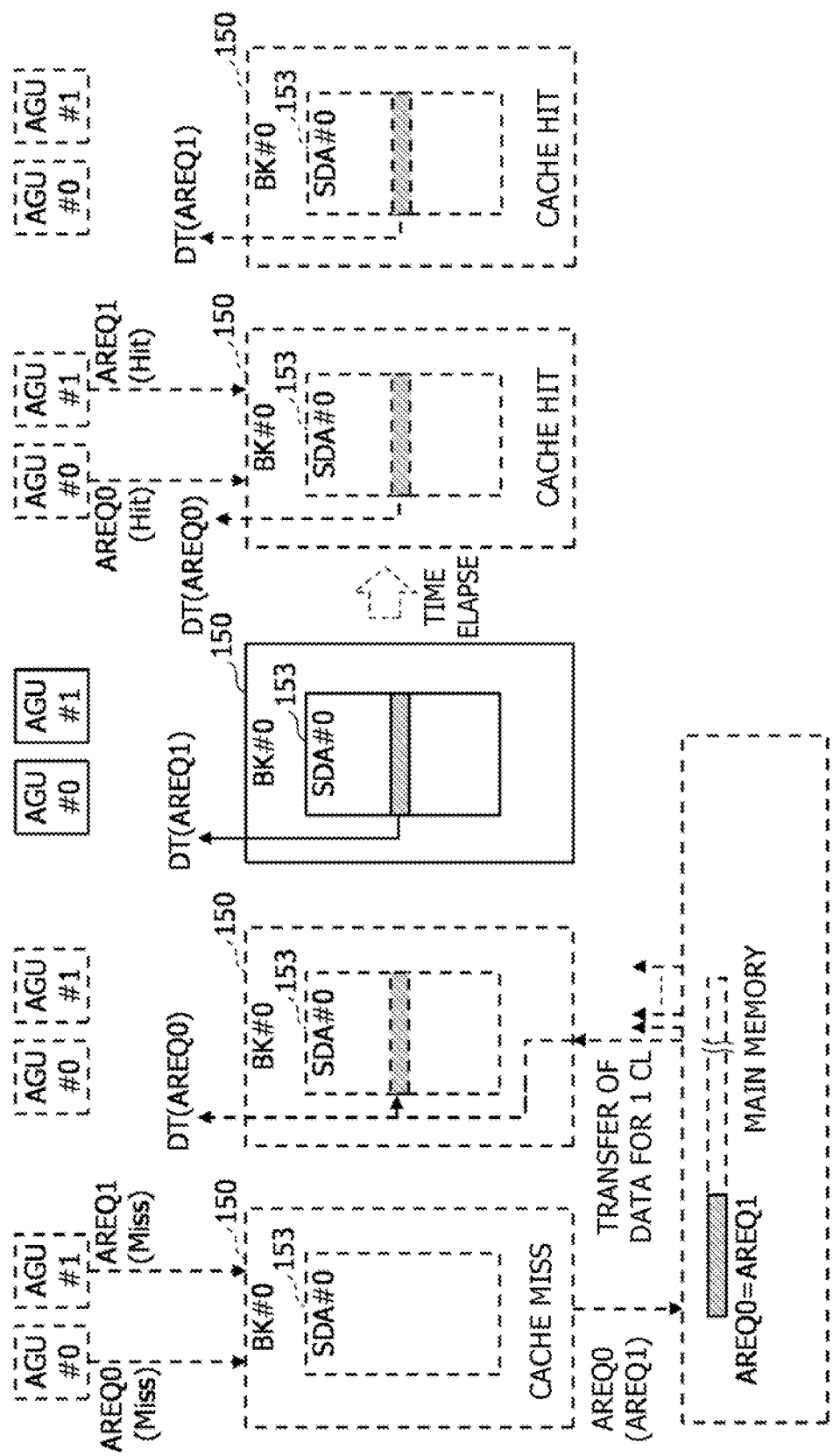

First, at the time of first iterative calculation, the bank BK #0 determines a cache miss of the access requests AREQ0 and AREQ1 having the same address in FIG. 7A. The bank BK #0 issues the access request AREQ0 with the highest priority to the main memory. In a similar manner to FIGS. 5A to 5C, since the addresses of the access requests AREQ0 and AREQ1 are the same each other, the bank BK #0 is meant to issue the access requests AREQ0 and AREQ1 to the main memory at the same time.

In FIG. 7B, the bank BK #0 outputs the data DT received from the main memory to the issuer of the access request AREQ0 with the highest priority, and stores it in the entry Ea of the SCA #0. Thereafter, in FIG. 7C, the bank BK #0 outputs the data DT received from the main memory and retained in the SCA #0 to the issuer of the access request AREQ1.

Figure 7D:
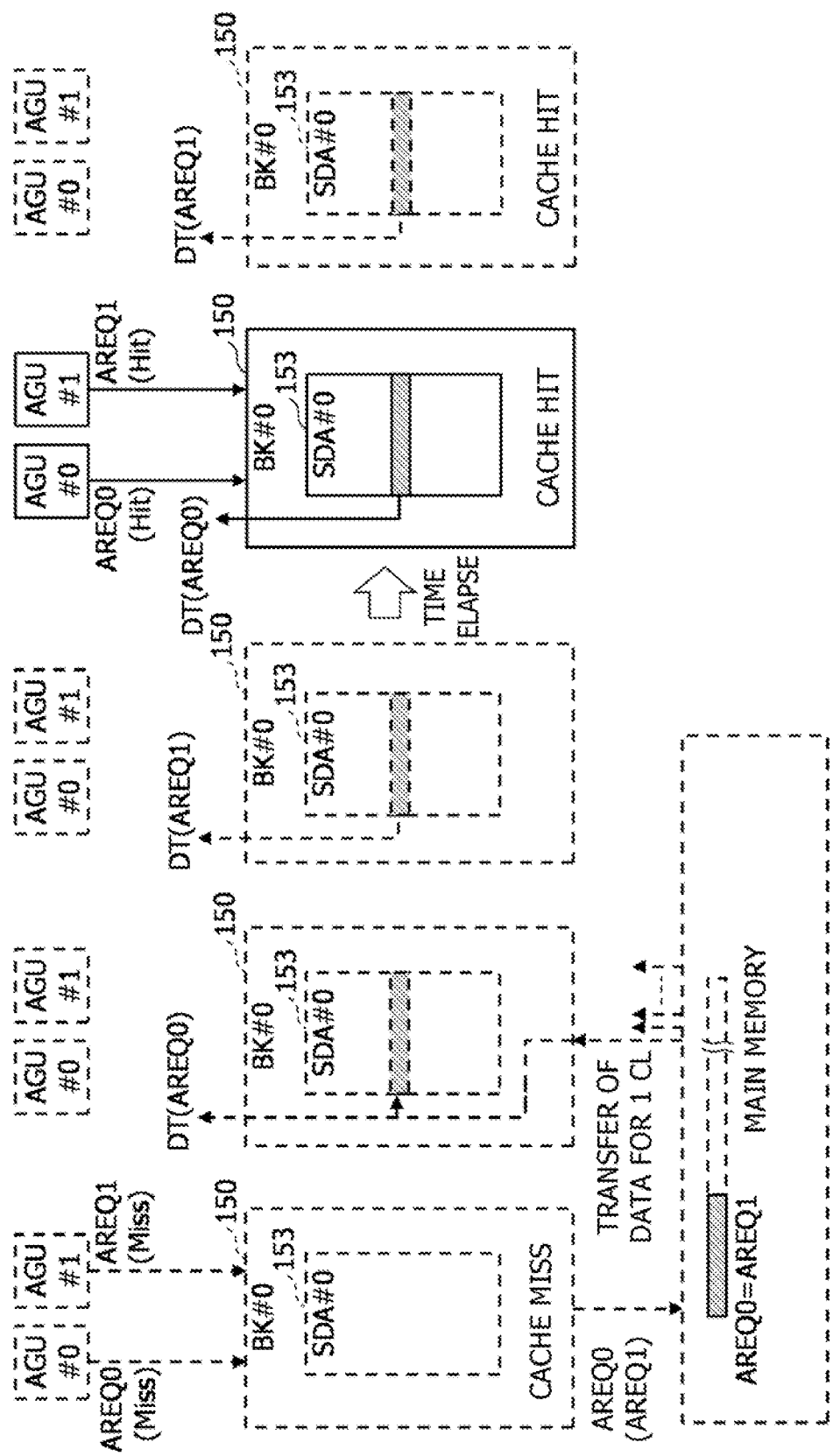
Figure 7E:
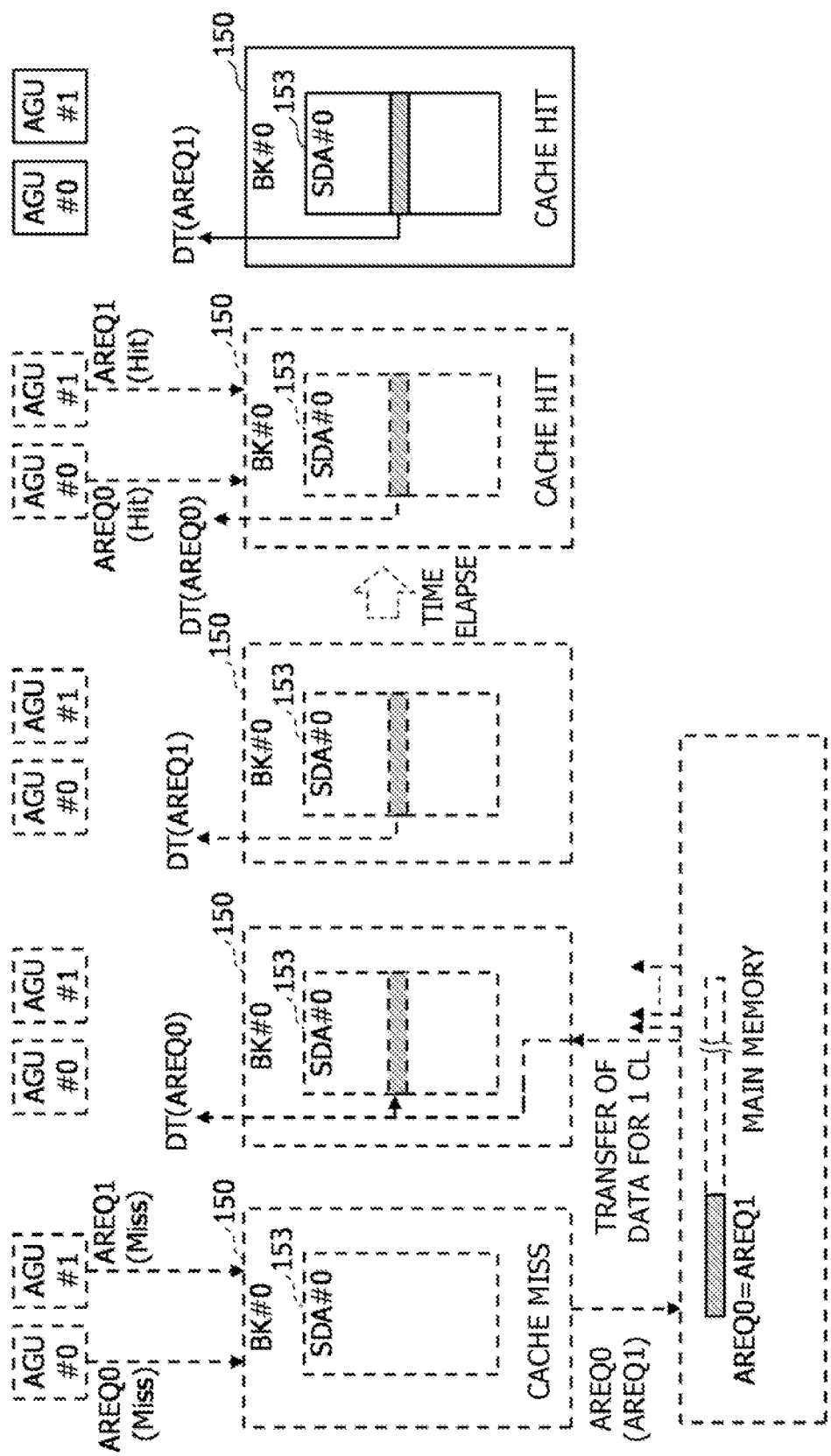

Next, at the time of second iterative calculation, the bank BK #0 determines a cache hit of the access requests AREQ0 and AREQ1 having the same address in FIG. 7D. The bank BK #0 extracts the data DT from the entry Ea corresponding to the index address included in the access request AREQ0 with the highest priority, and outputs it to the issuer of the access request AREQ0 in parallel. Next, in FIG. 7E, the bank BK extracts the data DT from the entry Ea corresponding to the index address included in the access request AREQ1, and simultaneously outputs it to the issuer of the access request AREQ1.

Since each bank BK of the arithmetic processing device that executes the operation illustrated in FIGS. 7A to 7E does not include an SDAC, it is not possible to redundantly execute the processing for the access requests AREQ0 and AREQ1 having the same address. Since the bank BK is caused to operate for each of the access requests AREQ0 and AREQ1 to output the data DT, the access efficiency is lowered as compared with the case of FIGS. 5A to 5C.

As described above, in this embodiment, it is possible to avoid, in the data cache having the plurality of banks BK capable of retaining data corresponding to access requests from the plurality of address generation unit (AGUs) 21, a conflict between the banks BK, and to improve the access efficiency. For example, it is possible to avoid a conflict between the banks BK at the time of executing iterative calculation such as sparse matrix-vector multiplication in which access requests having the same address are likely to be repeatedly issued by the plurality of address generation units 21, and to improve the access efficiency.

According to the priority determination logic 522, it is possible to select the access request with the highest priority and the access request with the second highest priority, and to cause the SDA and the SDAC to retain the same data according to the priority. As a result, in a case where a plurality of access requests having the same address is simultaneously issued and a cache hit occurs, it is possible to simultaneously output data corresponding to the access requests from the SDA and the SDAC, whereby it becomes possible to improve the access efficiency.

Furthermore, in a case where a plurality of access requests having different addresses is simultaneously issued, it is possible to select the access request with the highest priority, and to cause the SDA #0 to retain the data corresponding to the access request with the highest priority. Moreover, also in a case where a single access request is issued, it is possible to cause the SDA #0 to retain the data corresponding to the access request.

With the number of the SDACs 54 for each bank BK set to be less than that of the SDAs 53, it becomes possible to improve the access efficiency while suppressing the circuit scale of each bank BK and avoiding a conflict between the banks BK.

Figure 8:
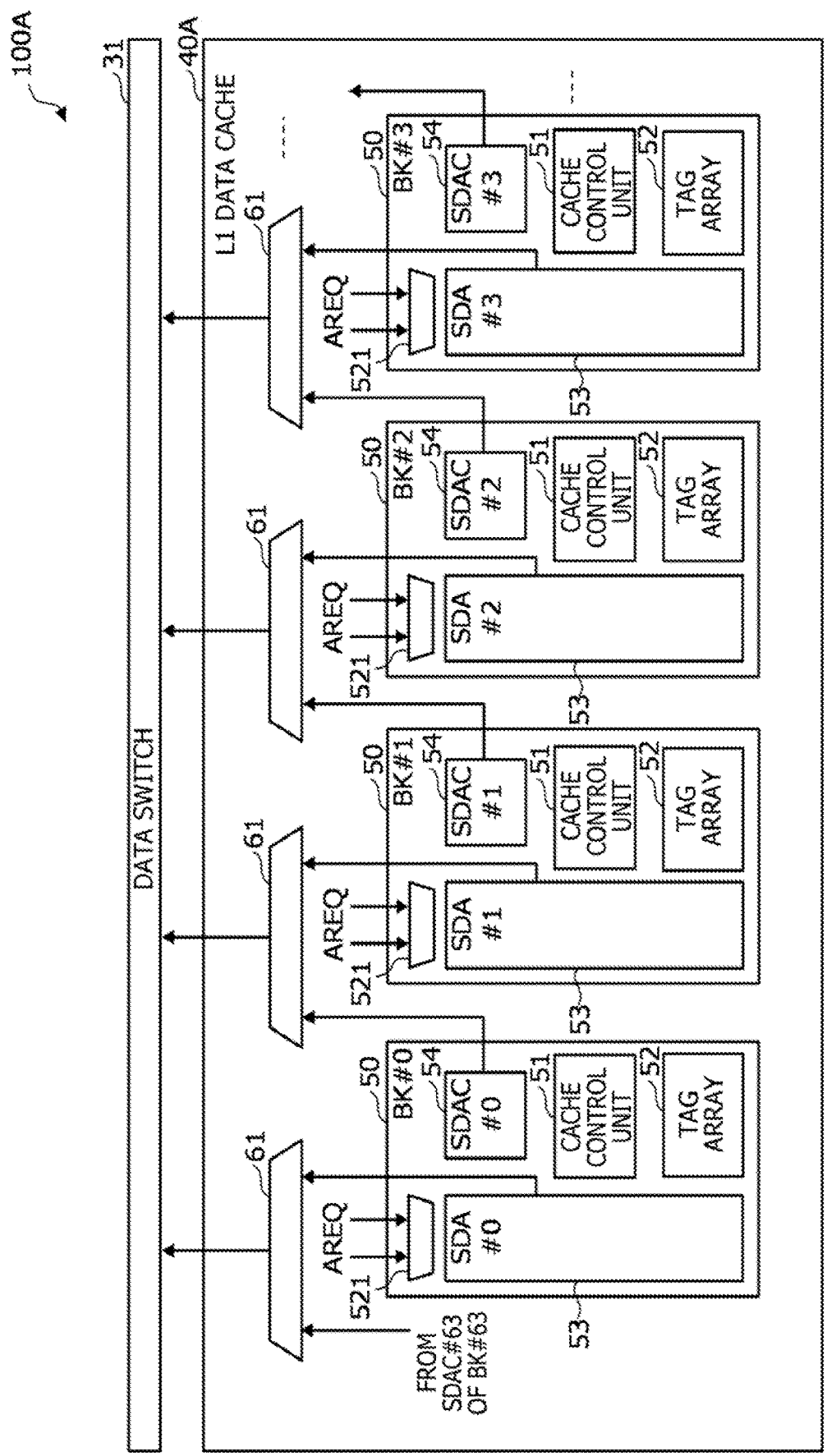
FIG. 8 is a block diagram illustrating an exemplary L1 data cache in an arithmetic processing device according to another embodiment.

FIG. 8 illustrates an example of the L1 data cache in an arithmetic processing device according to another embodiment. Elements similar to those in the above-described embodiment are denoted by the same reference signs, and detailed descriptions thereof are omitted. An arithmetic processing device 100A illustrated in FIG. 8 is, for example, a processor such as a CPU having a function of executing a plurality of product-sum operations and the like in parallel using a SIMD operation instruction. In FIG. 8, a configuration excluding an L1 data cache 40A is similar to the configuration of the arithmetic processing device 100 illustrated in FIG. 1.

The L1 data cache 40A has a configuration similar to that of the L1 data cache 40 in FIG. 1 except that it includes selectors 61. Each of the selectors 61 has a function of selecting one of data output from an SDA of one of two banks BK arranged adjacent to each other and data output from an SDAC of the other one of the two banks BK and outputting the selected data to the data switch 31. For example, in a case where the data output from the SDA and the data output from the SDAC conflict with each other, the selector 61 selects the data output from the SDA.

In a similar manner to FIG. 1, the arithmetic processing device 100A includes eight AGUs 21 and 16 banks BK. Accordingly, even in a case where access requests are issued from all the AGUs 21 at the same time, the number of the banks BK that receive the access requests is eight, which is half of the total number of the banks. Therefore, even if data lines are arranged between all the banks BK and the data switch 31, the number of the data lines to be used at the same time is half of all the data lines. Accordingly, it becomes possible to secure a certain probability that the data do not conflict with each other in the selector 61.

Figure 9:
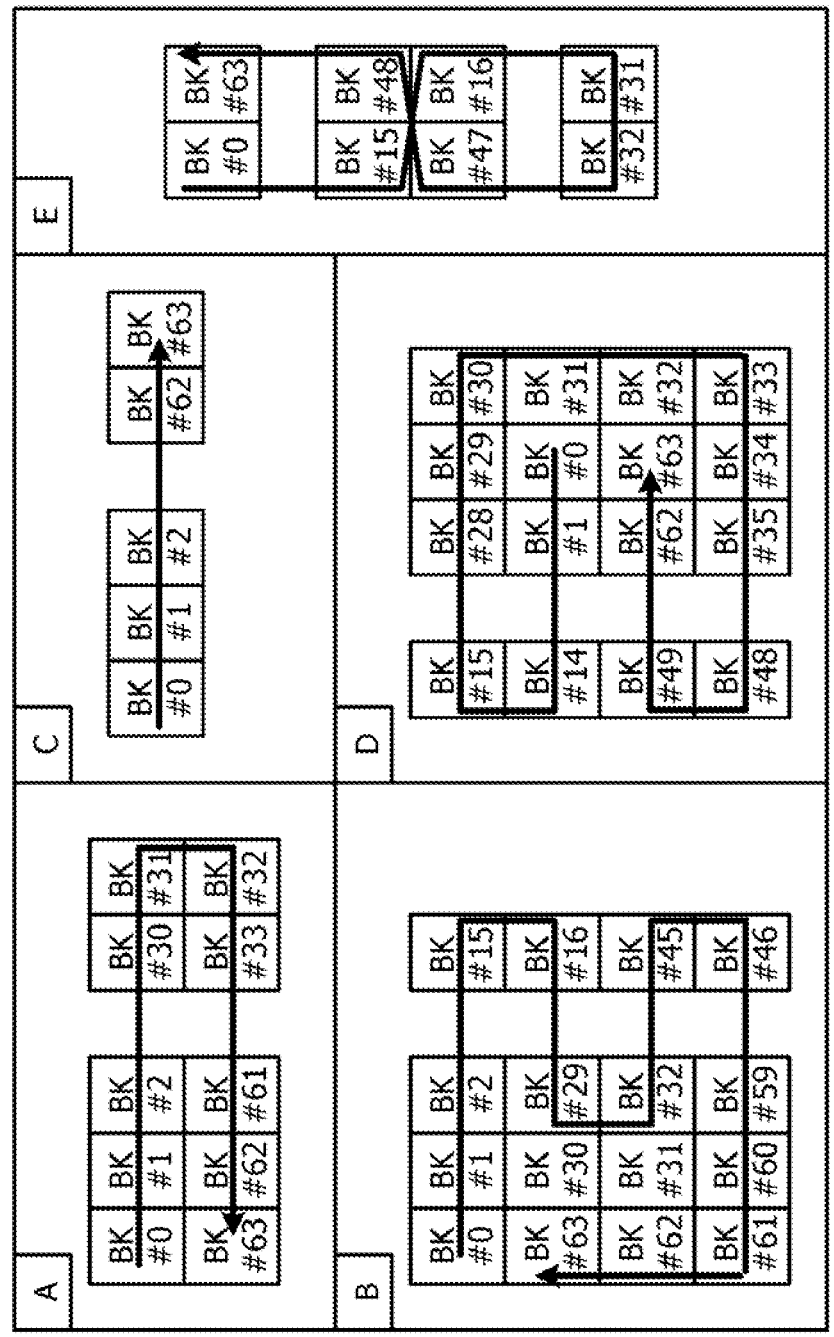
FIG. 9 is an explanatory diagram illustrating exemplary bank arrangement of the L1 data cache of FIG. 8.

FIG. 9 illustrates exemplary arrangement of the banks BK of the L1 data cache 40A in FIG. 8. A thick arrow illustrated in each of arrangement examples A, B, C, D, and E indicates the order of the banks BK connected via the selector 61 in FIG. 8. As illustrated in FIG. 9, with the banks BK arranged in a one-stroke manner, it becomes possible to make the length of the data line connecting each bank BK and the selector 61 the shortest and uniform, and to minimize variations in the data transmission delay.

Figure 10:
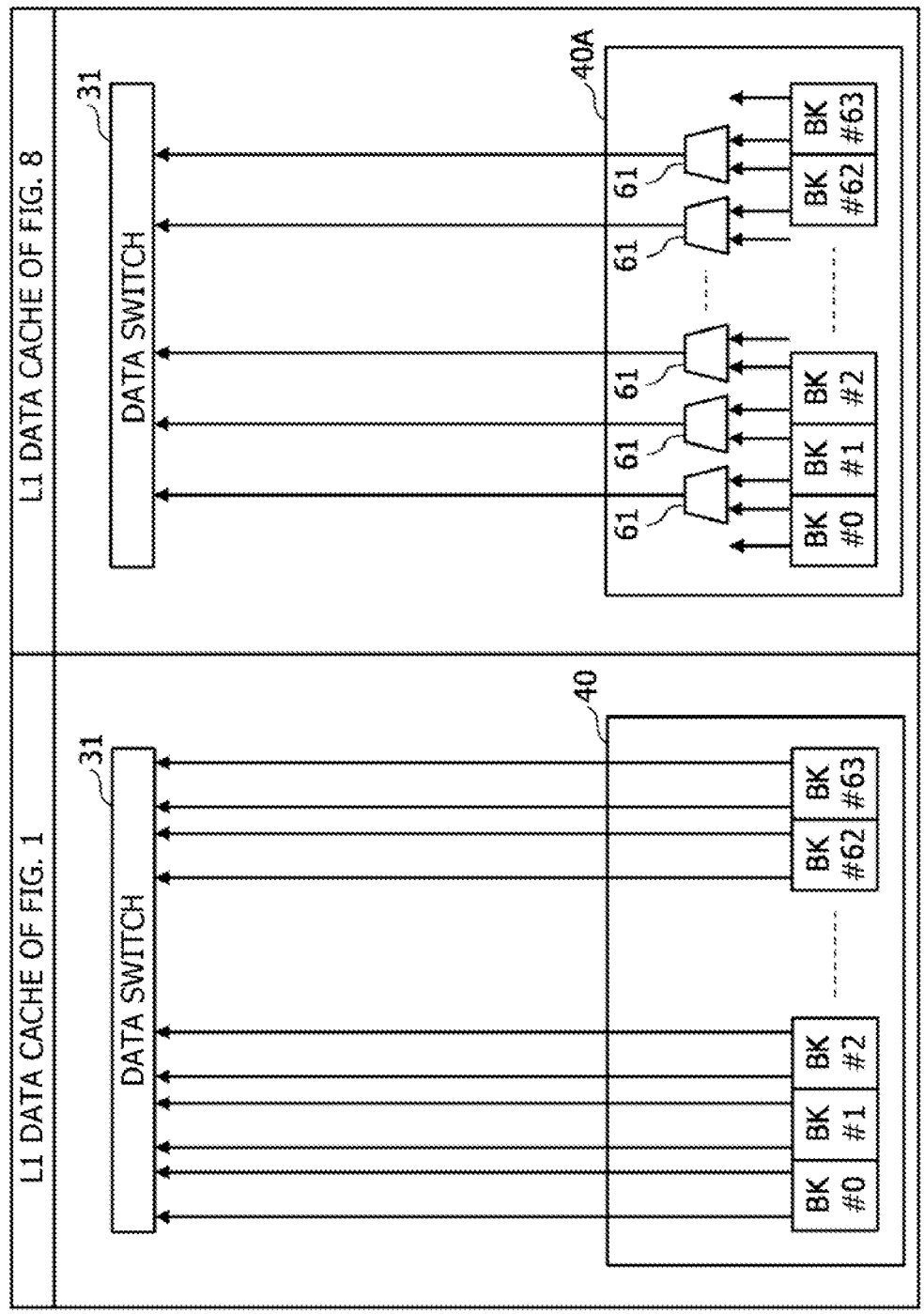
FIG. 10 is an explanatory diagram illustrating exemplary wiring from the L1 data cache to a data switch.

FIG. 10 illustrates exemplary wiring from the L1 data cache 40 or 40A to the data switch 31. In the L1 data cache 40A illustrated in FIG. 8, the number of the data lines connected between the banks BK and the data switch 31 may be reduced to approximately half of that of the L1 data cache 40 in FIG. 1. As a result, it is possible to reduce the area of the wiring area of the data lines. In a case where there is a certain distance between the L1 data cache 40A and the data switch 31, it is possible to make the area reduction amount based on the reduction of the data lines larger than the area increase amount based on the addition of the selectors 61. With this arrangement, it becomes possible to make the chip size of the arithmetic processing device 100A of FIG. 8 smaller than the chip size of the arithmetic processing device 100 of FIG. 1.

As described above, in this embodiment as well, it is possible to obtain effects similar to those of the above-described embodiment. For example, with the SDA and the SDAC provided in each bank BK, it becomes possible to avoid a conflict between the banks BK and to improve the access efficiency in a case where a plurality of access requests having the same address is repeatedly issued.

Moreover, in this embodiment, one of data output from an SDA of one of two banks BK arranged adjacent to each other and data output from an SDAC of the other one of the two banks BK is selected by the selector 61. With this arrangement, it becomes possible to reduce the area of the wiring area of the data lines, and to reduce the chip size of the arithmetic processing device 100A of FIG. 8.

FIGS. 11A to 12D illustrate exemplary operations of an arithmetic processing device according to another embodiment. For example, FIGS. 11A to 12D illustrate an exemplary arithmetic processing method of the arithmetic processing device. Detailed descriptions of operations similar to those in FIGS. 5A to 5C are omitted. An arithmetic processing device 100B that executes the operations illustrated in FIGS. 11A to 12D is, for example, a processor such as a CPU having a function of executing a plurality of product-sum operations and the like in parallel using a SIMD operation instruction. In the arithmetic processing device 100B, a configuration excluding each bank BK is similar to that of the arithmetic processing device 100 illustrated in FIG. 1. Furthermore, a configuration of each bank BK of the arithmetic processing device 100B is similar to the configuration of each bank BK illustrated in FIG. 1 except that a cache control unit 51B is included instead of the cache control unit 51 in FIG. 1.

In this embodiment, each bank BK retains, in an SDC and an SDAC, data corresponding to the access request with the second priority among a plurality of access requests having different addresses received at the same time. In FIGS. 11A to 12D, data to be used for iterative calculation is retained in the main memory, and the access requests AREQ0 and AREQ1 having different addresses each other are issued from the AGU #0 and the AGU #1.

Figure 11A:
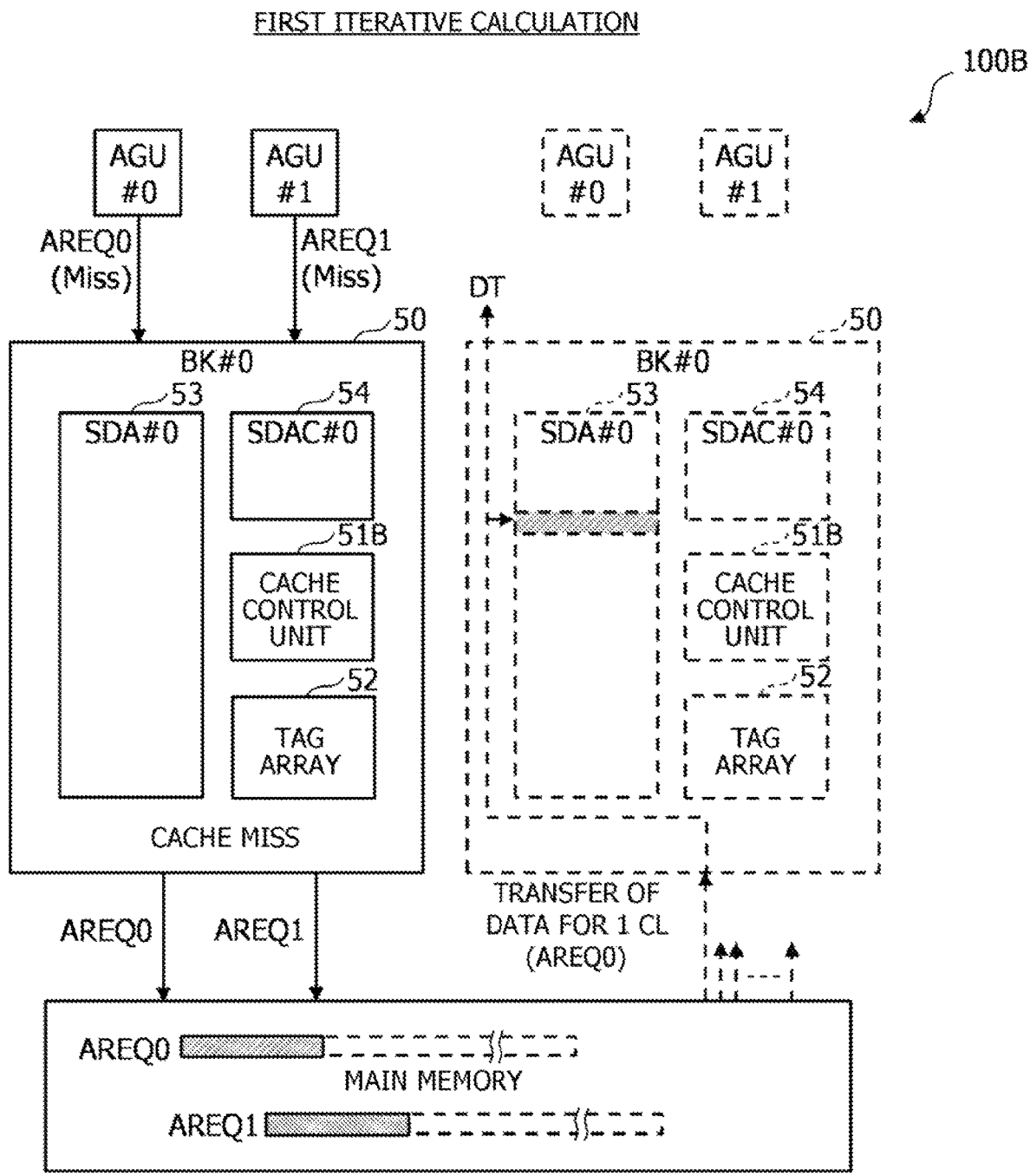
FIGS. 11A and 11B are explanatory diagrams illustrating exemplary operations of an arithmetic processing device according to another embodiment.
Figure 11B:
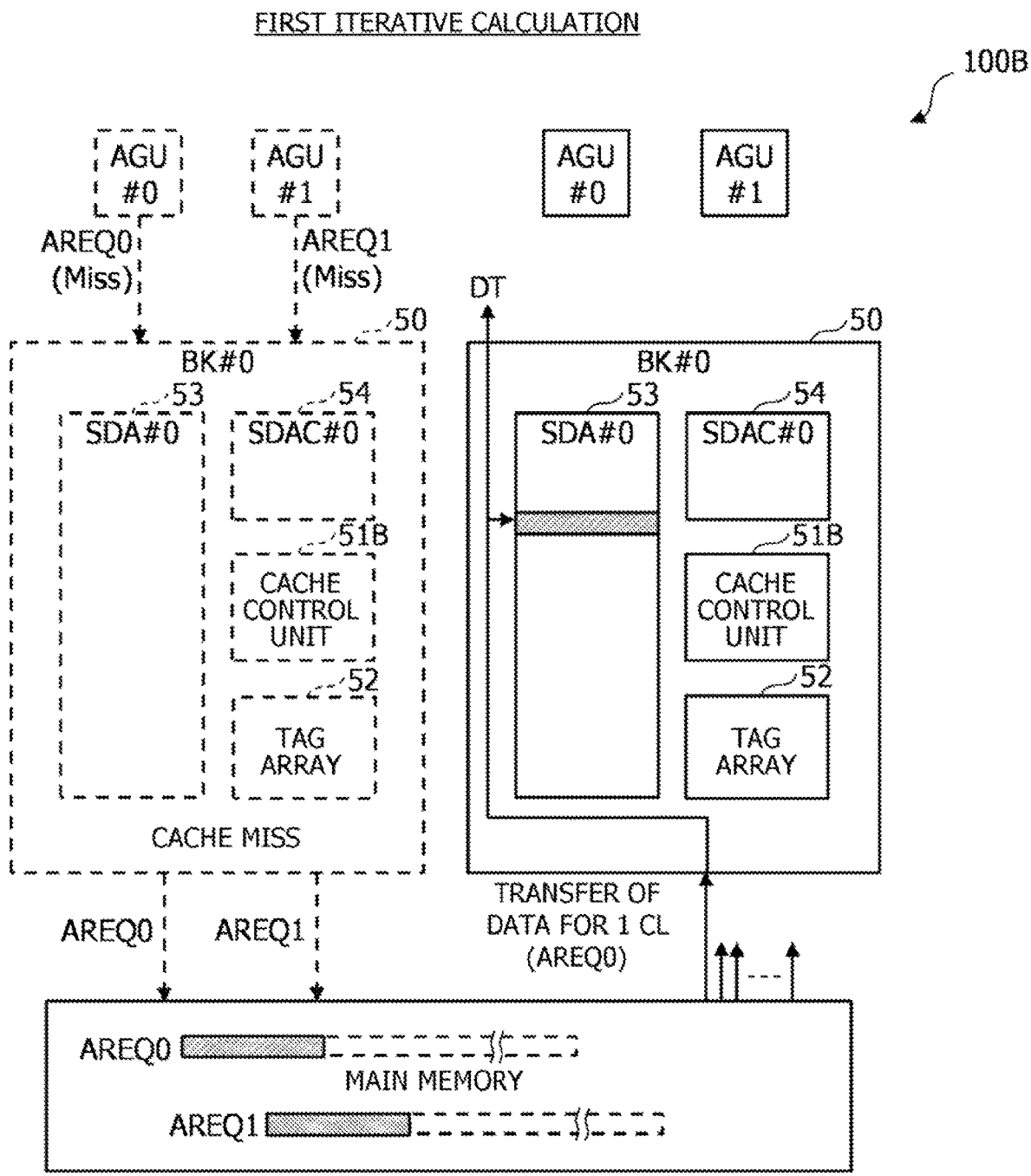

First, at the time of first iterative calculation, the cache control unit 51B of the bank BK #0 receives, from the tag array 52, notification of a hit miss of the access requests AREQ0 and AREQ1 having the different addresses in FIG. 11A. The cache control unit 51B sequentially issues the access requests AREQ0 and AREQ1 to the main memory in descending order of priority. In FIG. 11B, the main memory transfers data for one cache line CL to each bank BK as a response to the access request AREQ0.

The cache control unit 51B of the bank BK #0 outputs the data DT corresponding to the access request AREQ0 received from the main memory to the issuer of the access request AREQ0. Furthermore, the cache control unit 51B of the bank BK #0 stores the data DT corresponding to the access request AREQ0 received from the main memory in the entry Ea corresponding to the index address included in the access request AREQ0 in the SDA #0.

Figure 12A:
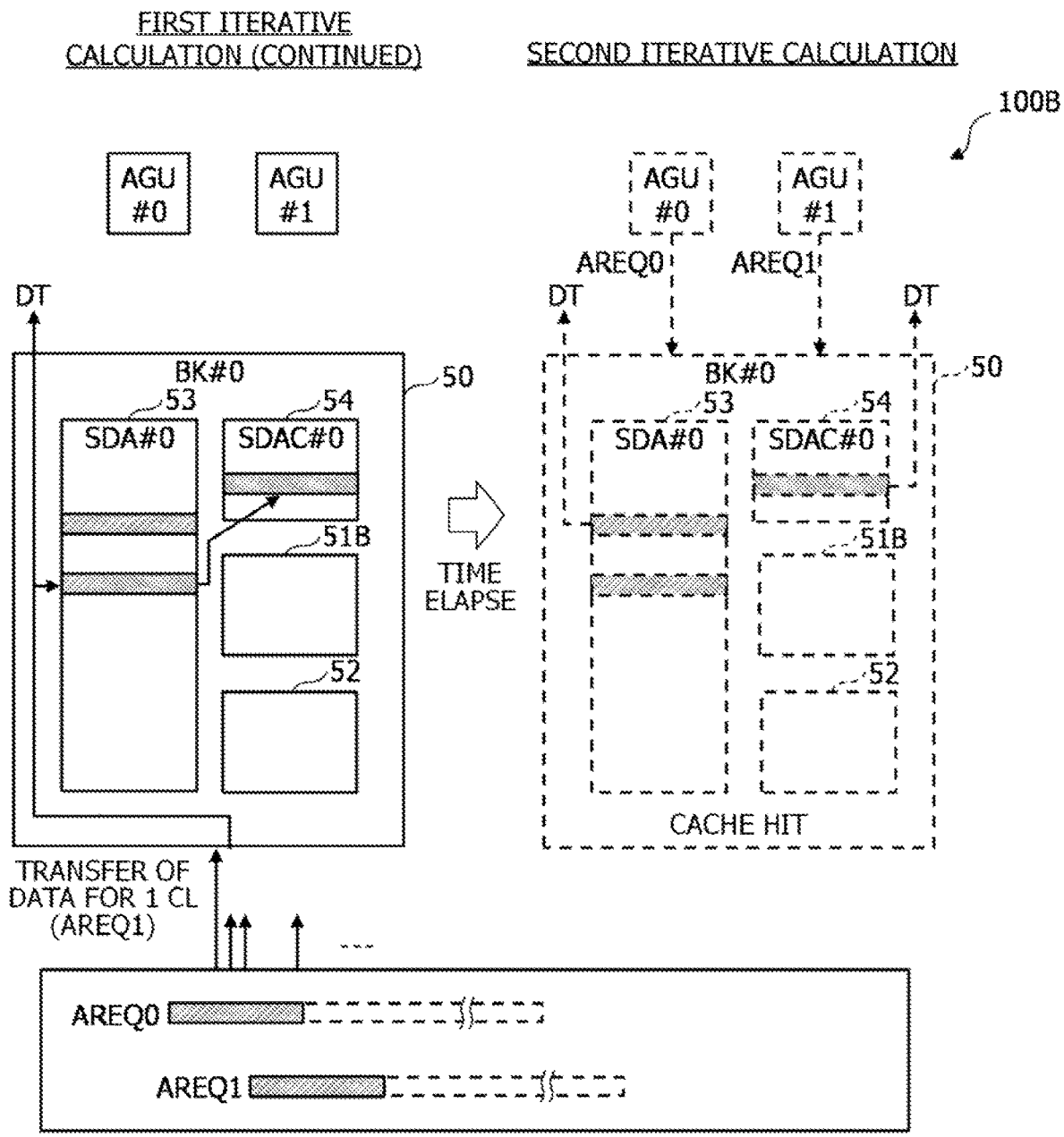
FIGS. 12A and 12B are diagrams illustrating operations following those in FIGS. 11A and 11B.
Figure 12B:
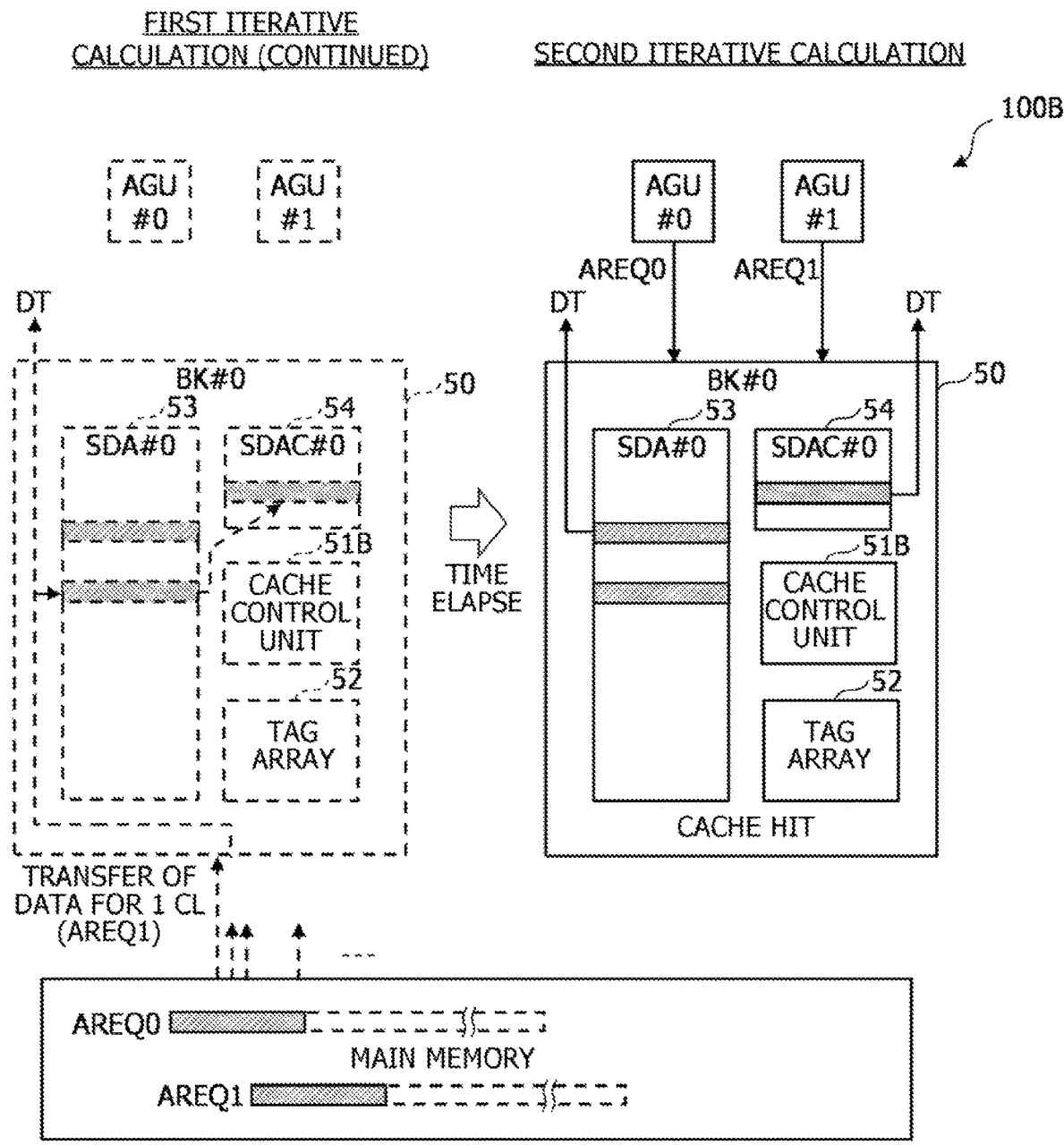

Next, in FIG. 12C, the cache control unit 51B of the bank BK #0 outputs the data DT corresponding to the access request AREQ1 received from the main memory to the issuer of the access request AREQ1. Furthermore, the cache control unit 51B of the bank BK #0 stores the data DT corresponding to the access request AREQ1 received from the main memory in the entry Ea corresponding to the index address included in the access request AREQ1 in the SDA #0. Moreover, the cache control unit 51B of the bank BK #0 stores the data DT corresponding to the access request AREQ1 received from the main memory in any of the entries Eb in association with the index address included in the access request AREQ1 in the SDAC #0.

Next, at the time of second iterative calculation, the cache control unit 51B of the bank BK #0 receives, from the tag array 52, notification of a cache hit of the access requests AREQ0 and AREQ1 having the different addresses each other in FIG. 12D. The cache control unit 51B extracts the data DT from the entry Ea corresponding to the index address included in the access request AREQ0 in the SDA #0. Furthermore, the cache control unit 51B extracts the data DT from the entry Eb for which a cache hit has been determined by the comparator 56 in FIG. 3 in the SDAC #0. Then, the cache control unit 51B simultaneously outputs the data DT extracted from the entries Ea and Eb to each of the issuers of the access requests AREQ0 and AREQ1.

With this arrangement, it becomes possible to improve the access efficiency in the case where the two access requests AREQ0 and AREQ1 having different addresses each other are subject to the cache hit in one bank BK in the second and subsequent iterative calculations. For example, it becomes possible to set the access latency for transferring the data DT to the issuers of the access requests AREQ0 and AREQ1 to be the same as the access latency for transferring the data DT to the issuer of the single access request AREQ0.

Figure 13:
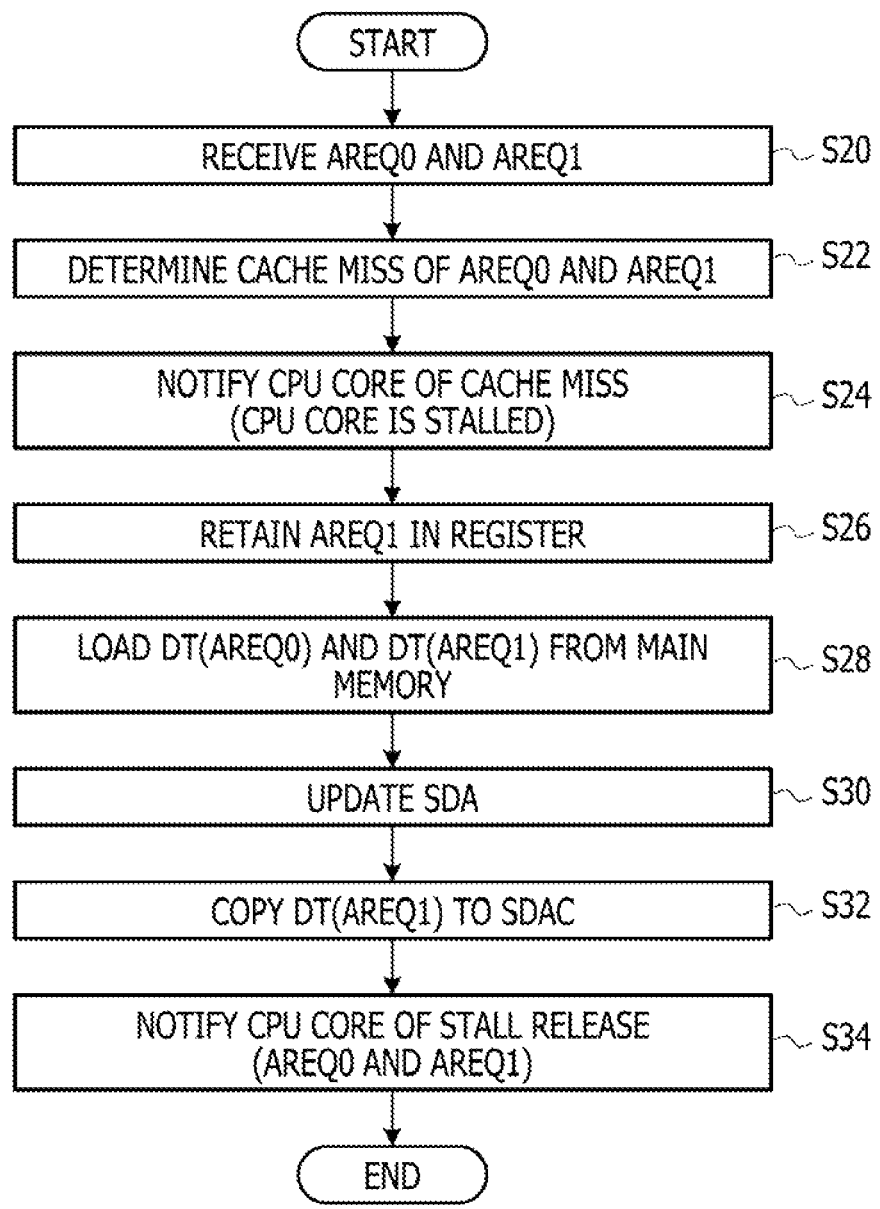
FIG. 13 is a flowchart illustrating exemplary operation of the arithmetic processing device illustrated in FIGS. 11A to 12D.

FIG. 13 illustrates exemplary operation of the arithmetic processing device 100B illustrated in FIGS. 11A to 12D. As described above, the configuration of the arithmetic processing device 100B is similar to the configuration of the arithmetic processing device 100 of FIG. 1 except for the cache control unit 51B of each bank BK.

First, in step S20, any of the banks BK receives the access requests AREQ0 and AREQ1 from the two AGUs 21. Next, in step S22, the tag array 52 of the bank BK that has received the access requests AREQ0 and AREQ1 determines a cache miss of the access requests AREQ0 and AREQ1. Next, in step S24, the cache control unit 51B of the bank BK that has determined the cache miss notifies the arithmetic unit 15 (i.e., the CPU core 110) of the cache miss via the AGUs 21 of the issuers of the access requests AREQ0 and AREQ1. As a result, the CPU core 110 stalls.

Next, in step S26, the cache control unit 51B of the bank BK that has received the access requests AREQ0 and AREQ1 temporarily retains the access request AREQ1 in a register or the like (not illustrated). Then, the cache control unit 51B sequentially issues the access requests AREQ0 and AREQ1 to the main memory.

Next, in step S28, the cache control unit 51B of each bank BK sequentially loads (receives), from the main memory, the data DT corresponding to the access request AREQ0 and the data DT corresponding to the access request AREQ1. The bank BK that has received the access request AREQ0 outputs the data DT received in response to the access request AREQ0 to the issuer of the access request AREQ0. Furthermore, the bank BK that has received the access request AREQ1 outputs the data DT received in response to the access request AREQ1 to the issuer of the access request AREQ1.

Next, in step S30, the cache control unit 51B of each bank BK stores each of the data DT received from the main memory in the SDA, thereby updating the SDA. Next, in step S32, the cache control unit 51B of the bank BK #0 that has received the access requests AREQ0 and AREQ1 copies the data DT corresponding to the access request AREQ1 to the SDAC. Next, in step S34, the cache control unit 51B notifies the CPU core 110 of a release of the stall for the access requests AREQ0 and AREQ1 via the AGUs 21 of the issuers of the access requests AREQ0 and AREQ1. Then, the operation illustrated in FIG. 13 is terminated.

FIGS. 14A to 14E illustrate exemplary operation of another arithmetic processing device. Detailed descriptions of operations similar to those in FIGS. 5A to 5C, FIGS. 7A to 7E, FIGS. 11A and 11B, and FIGS. 12C and 12D are omitted. A configuration of the arithmetic processing device that executes the operation illustrated in FIGS. 14A to 14E is a configuration similar to that of the arithmetic processing device 100B of FIGS. 11A and 11B except that each bank BK includes an SDA and includes no SDAC. In a similar manner to FIGS. 5A to 5C, in FIGS. 14A to 14E, data to be used for iterative calculation is retained in the main memory, and the access requests AREQ0 and AREQ1 having different addresses each other are issued from the AGU #0 and the AGU #1.

Figure 14A:
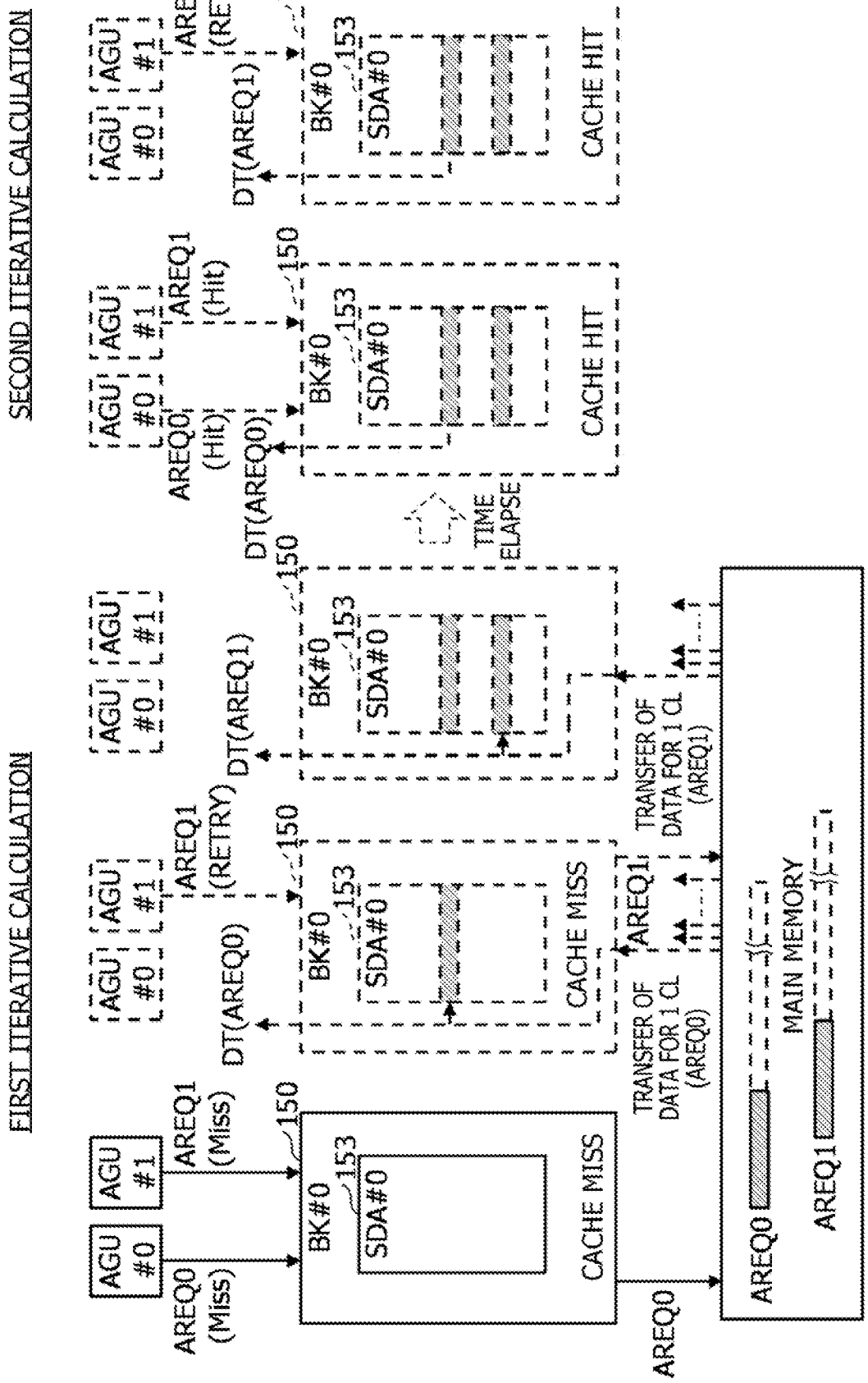

First, at the time of first iterative calculation, the bank BK #0 determines a cache miss of the access requests AREQ0 and AREQ1 having different addresses each other in FIG. 14A. The bank BK #0 issues the access request AREQ0 with the highest priority to the main memory. In a similar manner to FIGS. 11A and 11B, since the addresses of the access requests AREQ0 and AREQ1 are different from each other, the bank BK #0 issues the access request AREQ0 to the main memory in descending order of priority.

Figure 14B:
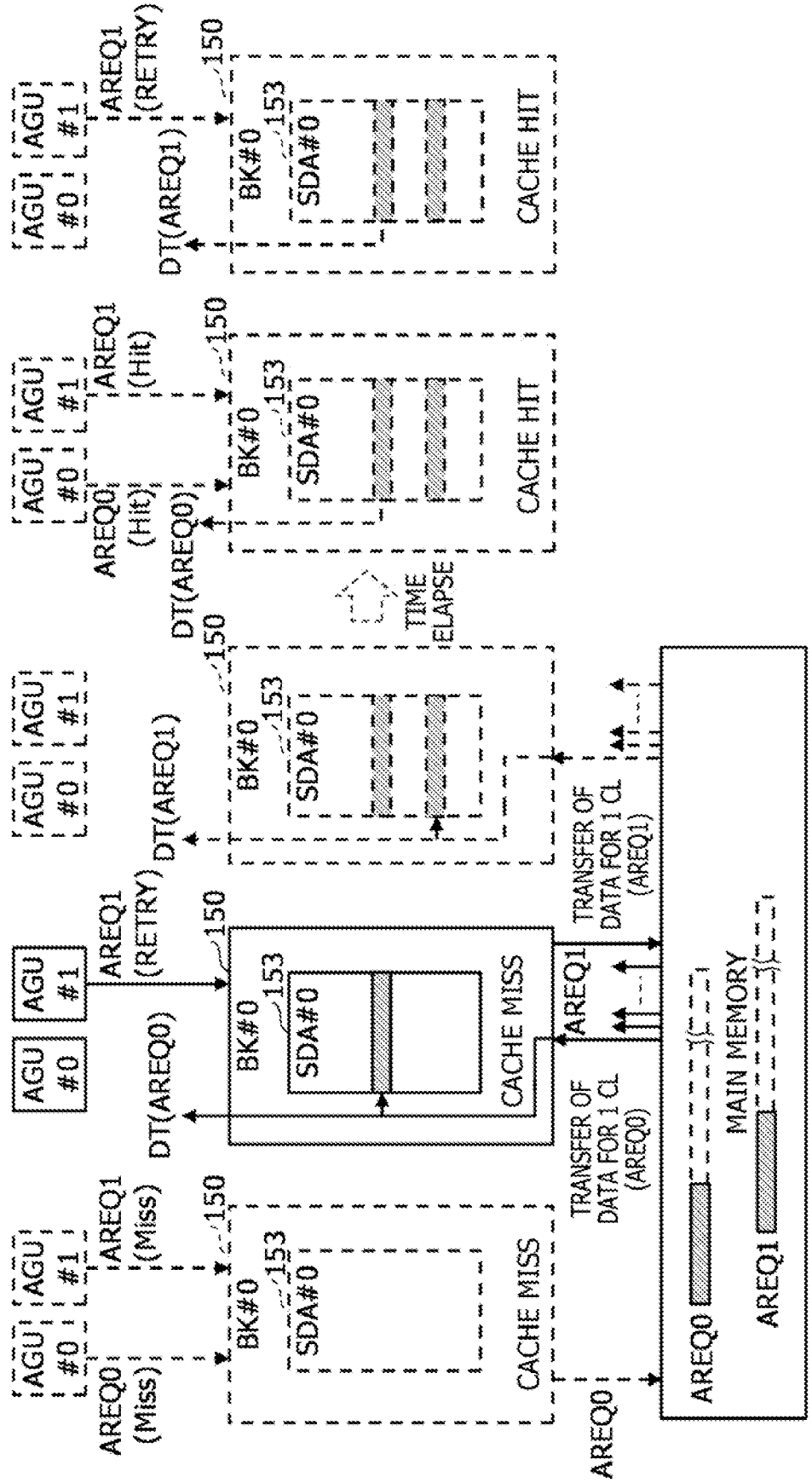

In FIG. 14B, the main memory transfers data for one cache line CL to each bank BK as a response to the access request AREQ0. The bank BK #0 outputs the data DT corresponding to the access request AREQ0 received from the main memory to the issuer of the access request AREQ0. Furthermore, the bank BK #0 stores the data DT corresponding to the access request AREQ0 received from the main memory in the entry Ea corresponding to the index address included in the access request AREQ0 in the SDA #0.

The AGU #1 issues the access request AREQ1 again (retry). The bank BK #0 that has received the retry of the access request AREQ1 issues the access request AREQ1 to the main memory.

Figure 14C:
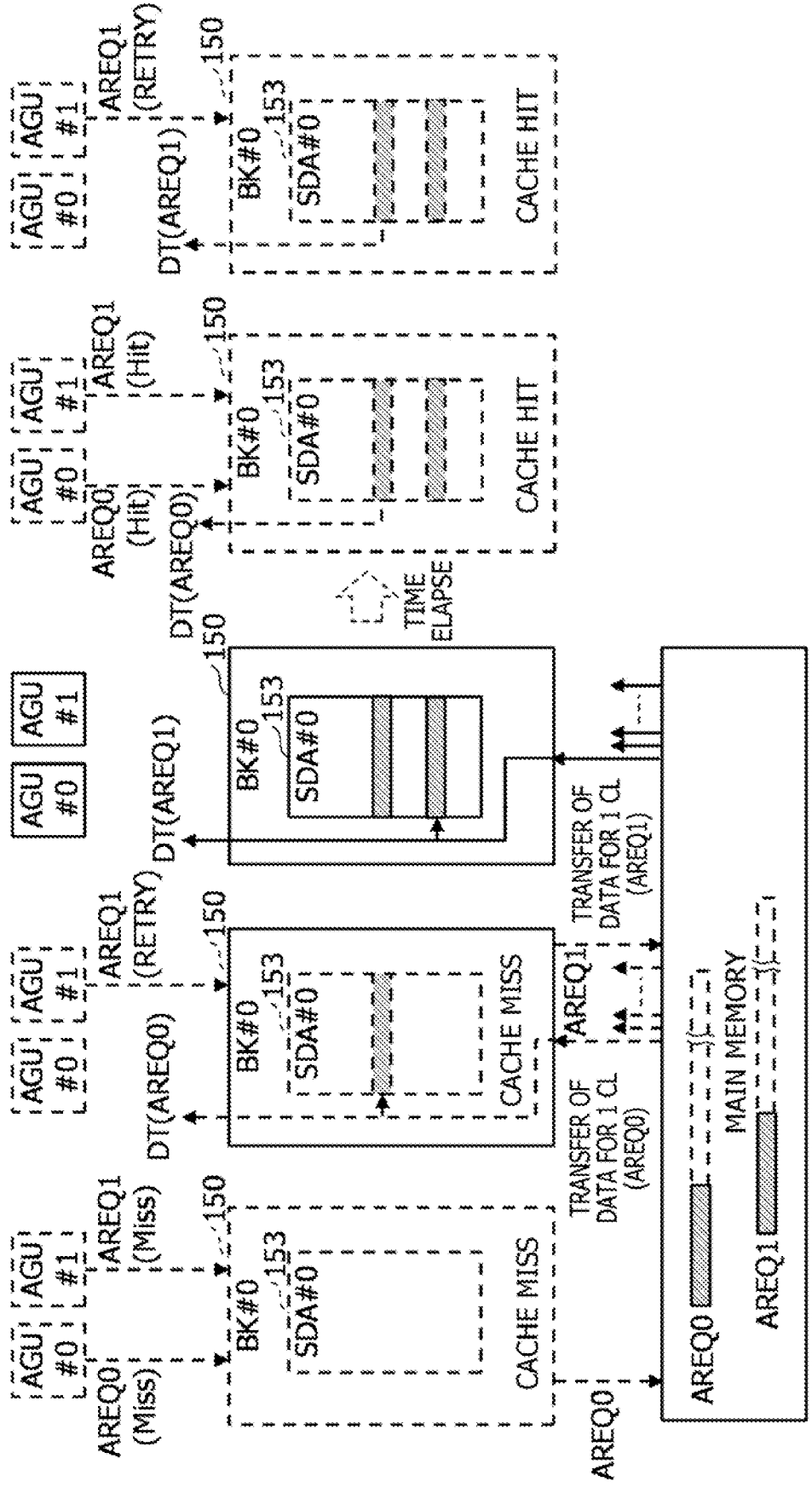

In FIG. 14C, the bank BK #0 outputs the data DT corresponding to the access request AREQ1 received from the main memory to the issuer of the access request AREQ1. Furthermore, the bank BK #0 stores the data DT corresponding to the access request AREQ1 received from the main memory in the entry Ea corresponding to the index address included in the access request AREQ1 in the SDA #0.

Figure 14D:
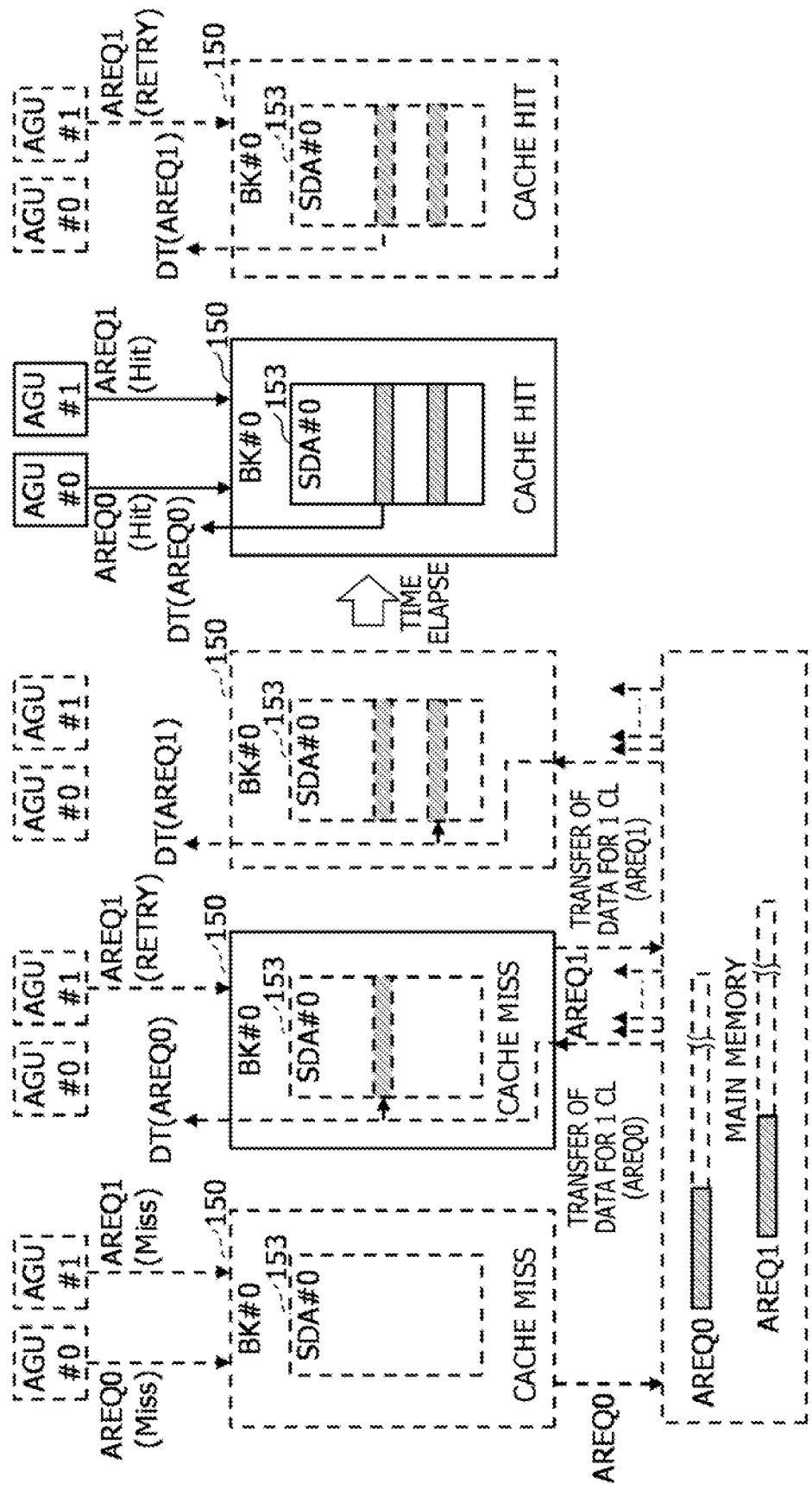

Next, at the time of second iterative calculation, the bank BK #0 determines a cache hit of the access requests AREQ0 and AREQ1 having different addresses each other in FIG. 14D. The bank BK #0 extracts the data DT from the entry Ea corresponding to the index address included in the access request AREQ0 with the highest priority, and outputs it to the issuer of the access request AREQ0. According to the operation of the bank BK #0 corresponding to the access request AREQ0 with the highest priority, the access request AREQ1 is stalled.

Next, in FIG. 14E, the bank BK #0 determines a cache hit of the access request AREQ1 (retry) reissued from the AGU #1. The bank BK #0 extracts the data DT from the entry Ea corresponding to the index address included in the access request AREQ1, and outputs it to the issuer of the access request AREQ1.

Since each bank BK of the arithmetic processing device that executes the operation illustrated in FIGS. 14A to 14E does not include an SDAC, it is not possible to redundantly execute the processing for the access requests AREQ0 and AREQ1 having the same address, in a similar manner to FIGS. 7A to 7E. Therefore, the access efficiency is lowered as compared with the operations in FIGS. 11A to 12D.

Figure 15:
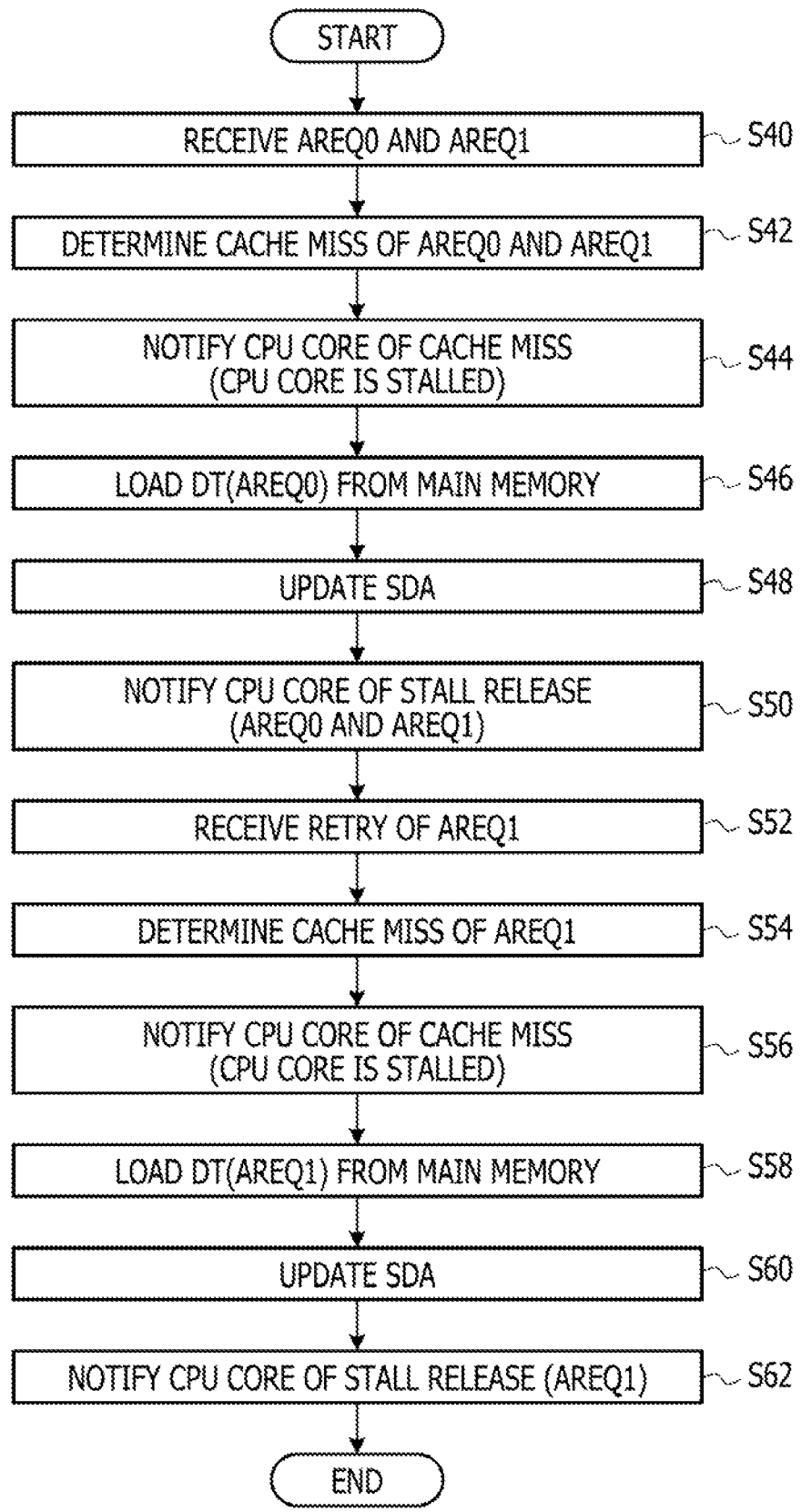
FIG. 15 is a flowchart illustrating the exemplary operation of the another arithmetic processing device illustrated in FIGS. 14A to 14E.

FIG. 15 illustrates the exemplary operation of the another arithmetic processing device illustrated in FIGS. 14A to 14E. Detailed descriptions of operations similar to those in FIG. 13 are omitted.

Operations of steps S40, S42, and S44 are similar to the operations of steps S20, S22, and S24 in FIG. 13, respectively. Next, in step S46, all the banks BK including the bank BK that has received the access requests AREQ0 and AREQ1 load (receive), from the main memory, the data DT for one cache line CL corresponding to the access request AREQ0. The bank BK that has received the access request AREQ0 outputs the received data DT to the issuer of the access request AREQ0.

Next, in step S48, each bank BK stores the data DT received from the main memory in response to the access request AREQ0 in the SDA, thereby updating the SDA. Next, in step S50, the cache control unit 51B notifies the CPU core 110 of a release of the stall for the access requests AREQ0 and AREQ1.

Next, in step S52, the bank BK corresponding to the access request AREQ1 receives the access request AREQ1 (retry). Next, in step S54, the bank BK that has received the access request AREQ1 (retry) determines a cache miss of the access request AREQ1. Next, in step S56, the bank BK that has received the access request AREQ1 (retry) notifies the CPU core 110 of the cache miss of the access request AREQ1 via the AGU 21 of the issuer of the access request AREQ1, for example. As a result, the CPU core 110 stalls.

Next, in step S58, the bank BK that has received the access request AREQ1 loads (receives), from the main memory, the data DT for one cache line CL corresponding to the access request AREQ1. The bank BK that has received the access request AREQ1 outputs the received data DT to the issuer of the access request AREQ1.

Next, in step S60, each bank BK stores the data DT received from the main memory in response to the access request AREQ1 in the SDA, thereby updating the SDA. Next, in step S62, the bank BK that has received the retry of the access request AREQ1 notifies the CPU core 110 of a release of the stall for the access request AREQ1. Then, the operation illustrated in FIG. 15 is terminated.

Figure 16:
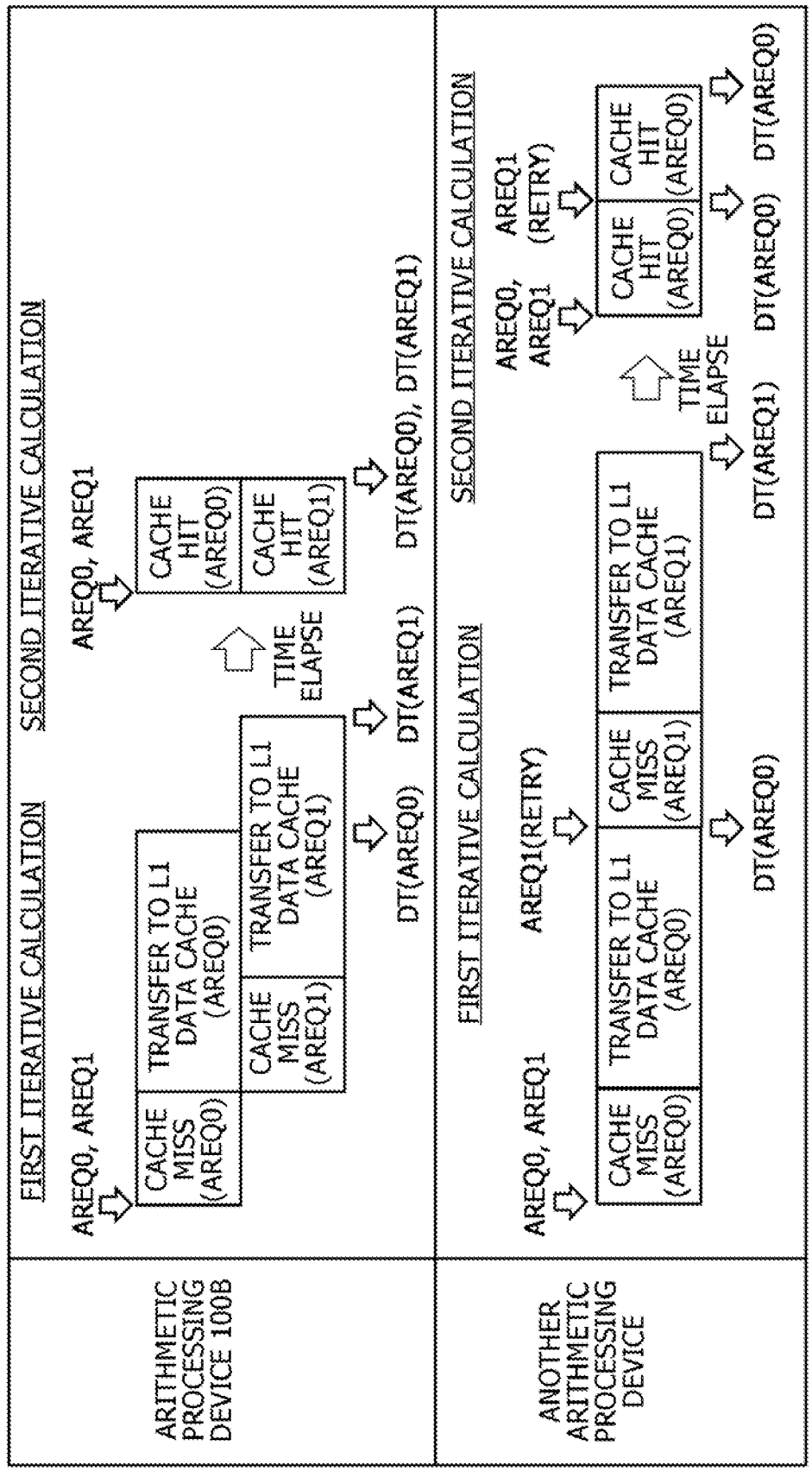
FIG. 16 is an explanatory diagram illustrating a comparative example of access efficiency between the arithmetic processing device illustrated in FIGS. 11A to 12D and the another arithmetic processing device illustrated in FIGS. 14A to 14E.

FIG. 16 illustrates a comparative example of access efficiency between the arithmetic processing device 100B illustrated in FIGS. 11A to 12D and the another arithmetic processing device illustrated in FIGS. 14A to 14E. In the first iterative calculation, the arithmetic processing device 100B is capable of issuing the access requests AREQ0 and AREQ1 (cache miss) having different addresses to the main memory in order. As a result, it is possible to redundantly execute the transfer of the data DT from the main memory to the L1 data cache in response to the access request AREQ1 and the transfer of the data DT from the main memory to the L1 data cache in response to the access request AREQ0. On the other hand, in the another arithmetic processing device illustrated in FIGS. 14A to 14E, the data DT is transferred from the main memory for each of the access requests AREQ0 and AREQ1. Therefore, at the time of a cache miss, the access latency of the another arithmetic processing device is longer than the access latency of the arithmetic processing device 100B.

In the second iterative calculation, the arithmetic processing device 100B is capable of processing the access requests AREQ0 and AREQ1 (cache hit) having different addresses each other in parallel. On the other hand, the another arithmetic processing device illustrated in FIGS. 14A to 14E outputs the data DT retained in the SDA corresponding to the access requests AREQ0 and AREQ1 to the issuer for each of the access requests AREQ0 and AREQ1. Therefore, at the time of a cache hit as well, the access latency of the another arithmetic processing device is longer than the access latency of the arithmetic processing device 100B.

As described above, in this embodiment as well, it is possible to obtain effects similar to those of the above-described embodiment. For example, with the SDA and the SDAC provided in each bank BK, it becomes possible to avoid a conflict between the banks BK and to improve the access efficiency in a case where a plurality of access requests having the same address is repeatedly issued. Moreover, according to this embodiment, with the SDA and the SDAC provided in each bank BK, it becomes possible to avoid a conflict between the banks BK and to improve the access efficiency in a case where a plurality of access requests having different addresses is repeatedly issued.

Figure 17:
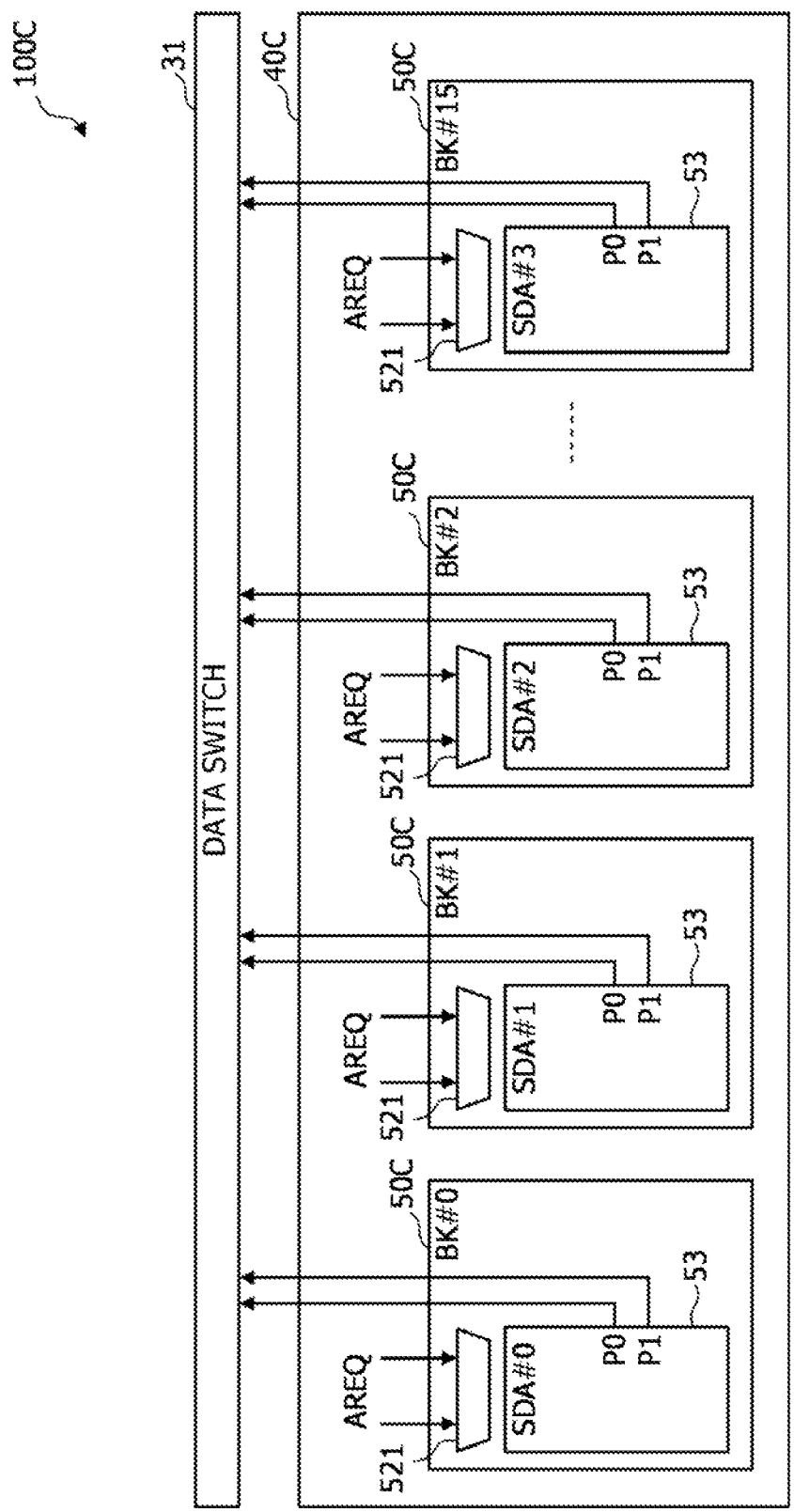
FIG. 17 is a block diagram illustrating an exemplary L1 data cache in an arithmetic processing device according to another embodiment.

FIG. 17 illustrates an example of the L1 data cache in an arithmetic processing device according to another embodiment. Elements similar to those in the above-described embodiment are denoted by the same reference signs, and detailed descriptions thereof are omitted. An arithmetic processing device 100C illustrated in FIG. 17 is, for example, a processor such as a CPU having a function of executing a plurality of product-sum operations and the like in parallel using a SIMD operation instruction. In the arithmetic processing device 100C, a configuration excluding an L1 data cache 40C is similar to the configuration of the arithmetic processing device 100 illustrated in FIG. 1.

Each bank BK (50C) of the L1 data cache 40C includes a multi-ported sub data array SDA, and includes no sub data array cache SDAC. For example, each bank BK has two ports P0 and P1 capable of outputting data. Each of the ports P0 and P1 is connected to the data switch 31 via a data line. For example, the port P0 outputs data corresponding to the access request with the highest priority, and the port P1 outputs data corresponding to the access request with the second highest priority. With this arrangement, operations similar to those in FIGS. 5A to 5C, FIGS. 11A and 11B, and FIGS. 12C and 12D are achieved.

Note that, in a similar manner to FIG. 8, the number of data lines connected to the data switch 31 may also be reduced by connecting the port P0 of one of banks BK adjacent to each other and the port P1 of the other one of the banks BK to the selector 61. As described above, in this embodiment as well, it is possible to obtain effects similar to those of the above-described embodiment.

Note that, while the embodiment described above has explained the example of being applied to the L1 data cache provided in the arithmetic processing device, it may also be applied to a data cache arranged between the arithmetic processing device and the main memory.

From the detailed descriptions above, characteristics and advantages of the embodiments will become apparent. This intends that claims cover the characteristics and advantages of the embodiments described above without departing from the spirit and the scope of claims. Furthermore, one of ordinary knowledge in the corresponding technical field may easily achieve various improvements and modifications. Therefore, there is no intention to limit the scope of the inventive embodiments to those described above, and it may rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a plurality of request issuing units each of which issues an access request to a storage device; and
a plurality of banks each of which includes: a first cache area that includes a plurality of first entries capable of retaining data read from the storage device; a second cache area that includes a plurality of second entries; a cache control unit; and a hit miss determination unit that determines a cache hit or a cache miss for each of the plurality of banks on a basis of the access request issued from each of the plurality of request issuing units, wherein
the cache control unit is configured to:
in response that a plurality of the access requests simultaneously received from the plurality of request issuing units makes the cache miss, store data, which is read from the storage device respectively in response to the plurality of access requests, in one of the first entries and one of the second entries; and
in response that the plurality of access requests simultaneously received from the plurality of request issuing units makes the cache hit in the first cache area and the second cache area, output data retained in the first entry and the second entry that have made the cache hit, to each of issuers of the plurality of access requests.

2. The arithmetic processing device according to claim 1, wherein
in a case where a plurality of the simultaneously received access requests with a same address makes the cache miss, the cache control unit stores common data read from the storage device in response to the plurality of access requests in each of one of the first entries and one of the second entries.

3. The arithmetic processing device according to claim 1, further comprising:
a selector that selects one of data output from the first cache area of one of two banks adjacent to each other among the plurality of banks and data output from the second cache area of the other one of the two banks; and
a data line that outputs the data selected by the selector to the issuers of the access requests.

4. The arithmetic processing device according to claim 1, wherein
in a case where a plurality of the simultaneously received access requests with different addresses makes the cache miss, the cache control unit sequentially issues the plurality of access requests that has made the cache miss to the storage device, sequentially receives the data read from the storage device, and stores the received data in each of one of the first entries and one of the second entries.

5. The arithmetic processing device according to claim 1, wherein
the cache control unit is configured to:
include a priority determination unit that determines a priority of the plurality of access requests simultaneously received from the plurality of request issuing units;
store data that corresponds to the access request in which the priority determined by the priority determination unit is highest in the first entry; and
store data that corresponds to the access request in which the priority determined by the priority determination unit is second highest in the second entry.

6. The arithmetic processing device according to claim 5, wherein
each of the plurality of banks includes a plurality of the second cache areas, and
the cache control unit stores data that corresponds to the access request in which the priority determined by the priority determination unit is second highest or lower in each of the plurality of second entries.

7. The arithmetic processing device according to claim 1, wherein
a number of the second entries of the second cache area is less than a number of the first entries of the first cache area.

8. An arithmetic processing device comprising:
a plurality of request issuing units each of which issues an access request directed to a storage device; and
a plurality of banks each of which includes: a cache area that includes a plurality of entries capable of retaining data read from the storage device and a plurality of ports that outputs data; a cache control unit; and a hit miss determination unit that determines a cache hit or a cache miss for each of the plurality of banks on a basis of the access request issued from each of the plurality of request issuing units, wherein
the cache control unit is configured to:
in response that a plurality of the access requests with a same address simultaneously received from the plurality of request issuing units makes the cache miss, store common data, which is read from the storage device in response to the plurality of access requests, in one of the entries; and
in response that the plurality of access requests with the same address simultaneously received from the plurality of request issuing units makes the cache hit, output data included in a first entry that has made the cache hit, to each of issuers of the plurality of access requests via the plurality of ports.

9. An arithmetic processing method for an arithmetic processing device that includes a plurality of request issuing units each of which issues an access request directed to a storage device and a plurality of banks each of which includes: a first cache area that includes a plurality of first entries capable of retaining data read from the storage device; a second cache area that includes a plurality of second entries; a cache control unit; and a hit miss determination unit that determines a cache hit or a cache miss for each of the plurality of banks on a basis of the access request issued from each of the plurality of request issuing units, the arithmetic processing method comprising:
in response that a plurality of the access requests simultaneously received from the plurality of request issuing units makes the cache miss, storing data, which is read from the storage device respectively in response to the plurality of access requests, in one of the first entries and one of the second entries; and
in response that the plurality of access requests simultaneously received from the plurality of request issuing units makes the cache hit in the first cache area and the second cache area, outputting data included in the first entry and data included in the second entry that have made the cache hit, to each of issuers of the plurality of access requests.

* * * * *